US005982944A

United States Patent [19]
Vaidyanathan et al.

[11] Patent Number: 5,982,944
[45] Date of Patent: Nov. 9, 1999

[54] ADAPTIVE VISION SYSTEM USING DUAL THRESHOLDING

[75] Inventors: Akhileswar Ganesh Vaidyanathan, Hockessin; James Arthur Whitcomb, Wilmington, both of Del.

[73] Assignee: E. I. du Pont de Nemours and Company, Wilmington, Del.

[21] Appl. No.: 08/991,695

[22] Filed: Dec. 16, 1997

Related U.S. Application Data

[63] Continuation-in-part of application No. 08/349,212, Dec. 5, 1994, abandoned, which is a continuation-in-part of application No. 07/767,339, Sep. 27, 1991, Pat. No. 5,481,620.

[51] Int. Cl.⁶ ..................................................... G06K 9/38
[52] U.S. Cl. ........................... 382/271; 382/168; 382/172; 382/169
[58] Field of Search ..................................... 382/271, 168, 382/172, 169, 273, 274, 251, 253, 270; 358/466; 307/350

[56] References Cited

U.S. PATENT DOCUMENTS

| | | | |
|---|---|---|---|
| 3,736,432 | 5/1973 | Sweet | 250/222 PC |
| 3,811,036 | 5/1974 | Perry | 235/92 PC |
| 3,873,974 | 3/1975 | Bouton et al. | 382/48 |
| 3,999,047 | 12/1976 | Green | 382/51 |
| 4,097,845 | 6/1978 | Bacus | 340/146.3 |
| 4,183,013 | 1/1980 | Agrawala | 377/10 |
| 4,453,266 | 6/1984 | Bacus | 382/6 |
| 4,618,989 | 10/1986 | Tsukune et al. | 382/25 |
| 4,637,053 | 1/1987 | Schalkowsky | 382/6 |
| 4,747,153 | 5/1988 | Kuono et al. | 382/25 |
| 4,809,349 | 2/1989 | Herby et al. | 382/50 |
| 4,959,869 | 9/1990 | Hongo | 382/51 |
| 5,046,118 | 9/1991 | Ajewole et al. | 382/51 |
| 5,083,313 | 1/1992 | Reinsch | 382/8 |
| 5,138,671 | 8/1992 | Yokoyama | 382/52 |
| 5,481,620 | 1/1996 | Vaidyanathan | 382/169 |

FOREIGN PATENT DOCUMENTS

| | | | |
|---|---|---|---|
| 2 602 074 | 7/1986 | France | G06F 15/62 |
| 62-60069 | 12/1987 | Japan | C12M 1/34 |
| WO 93/06562 | 4/1993 | WIPO | G06F 15/72 |
| WO 94/16402 | 7/1994 | WIPO | G06F 15/62 |
| WO 94/16403 | 7/1994 | WIPO | G06F 15/70 |
| WO 94/16405 | 7/1994 | WIPO | G06F 15/72 |

OTHER PUBLICATIONS

Marr, D, "Early Processing of Visual Information", *Image Understanding*, eds. S. Ullman and W. Richards, Ablex Publishing Company, 1984.

Shannon, C.E.,"A Mathematical Theory of Communication", *Bell Syst. Tech. J.*, 27, 379–423, Jul. 1948.

Pun, T., "Entropic Thresholding, A New Approach", *Comp. Graphics and Image Proc.*, 16, 210–239, 1981.

Kapur, J.N. et al,. "A New Method for Gray–Level Picture Thresholding Using the Entropy of the Histogram", *Comp. Graphics and Image Proc.*, 29, 273–285, 1985.

(List continued on next page.)

*Primary Examiner*—Jose L. Couso
*Assistant Examiner*—Anh Hong Do

[57] ABSTRACT

Image analysis methods and systems are used for identifying objects in a background by defining a data space, such as a histogram or a color space. The data space comprises a plurality of sub-spaces, which could be selected based, for example, on a histogram, or on the way pixel values or color parameters cluster in their respective spaces. The threshold values in the data space are selected, a list of all ordered pairs of thresholds is generated to define multiple data sub-spaces, and the image is multiply searched, once in each sub-space for at least one representation of a candidate object, where the candidate object has at least one predetermined attribute value. Valid objects are identified by comparing the candidate object attribute values to a defined set of valid object attribute values contained in a driver.

20 Claims, 28 Drawing Sheets

OTHER PUBLICATIONS

Pal, S.K. et al, "Entropic Thresholding", *Signal Processing*, 16, 97–108, 1989.

Haralick, R.M. et al, "Textural Features for Image Classification", *IEEE Transactions on Systems, Man & Cybernetics*, SMC–3(6), 610–621, 1973.

Wang, S. et al, "Automatic Multithreshold Selection", *Computer Vision Graphics and Image Processing*, 25, 46–67, 1984.

Fernandes, M.A. et al, "Detection and Quantification of Microorganisms in a Heterogeneous Foodstuff by Image Analysis", *Cabios*, 4(2), 291–295, 1988.

Domino Image Analysis System, Perceptive Instruments (Essex, England) (unknown date).

Seescan Imaging Plate Reader, Seescan Imaging Limited (Cambridge, England) (unknown date).

Protos Colony Counter Analytical Measuring Systems (Cambridge, England) (unknown date).

Image 40–10 Analyzer, Analytical Measuring Systems (Cambridge, England) (unknown date).

Bio–Foss Colony Counting System, Foss Electric (York, England) (unknown date).

Artek 810 Image Analyzer, Dynatech Laboratories, Inc. (Chantilly, VA) (unknown date).

Optimas Image Analyzer, Bio Scan (Edmonds, WA) May 1990 (unknown date).

Video Densitometer II, Biomed Instruments, Inc. (Fullerton, CA) 1990 (unknown date).

Image–Pro Plus, Media Cybernetics (Silver Spring, MD) (unknown date).

Johannsen, G. et al, "A Threshold Selection Method Using Information Measures", Proc. 6th Int. Conf. on Pattern Recognition, 1982.

Sahoo, P.K. et al, "A Survey of Thresholding Techniques", *Computer Vision, Graphics and Image Processing*, 41, 233–260, 1988.

Abutaleb, A.S., "Automatic Thresholding of Grey–Level Pictures Using Two Dimensional Entropy", *Computer Vision, Graphics and Image Processing*, 47, 22–32, 1989.

Lee, S.U. et al, "A Comparative Performance Study of Several Global Thresholding Techniques for Segmentation", *Computer Vision, Graphics, and Image Processing*, 52, 171–190, 1990.

Wong, A.K.C., et al, "A Gray Level Threshold Selection Method Based on Maximum Entropy Principle", *IEEE Transactions on System, Man and Cybernetics*, 19, 866–871, 1989.

Mehmet Celenk, "A Color Clustering Technique for Image Segmentation", *Computer Vision, Graphics and Image Processing*, 52, 145–170, 1990.

Miyamoto, S. et al, "Enhancement of Laser Radar Images By A Class of Piecewise Linear Transformations of Gray Levels Based on Entropy Criteria", *1985 IEEE Workshop on Languages for Automation*, Jun. 29, 1985, Palma De Mallorca, Spain, 265–269.

Landeweerd, G.H. et al, "Pattern Recognition of Nucleated Cells from the Peripheral Blood", *Pattern Recognition*, 16(2), 131–140, 1983.

Artek 880 Image Analyzer, Dynatech Laboratories, Inc., (Chantilly, VA). (unknown date).

D. Wermser et al., Segmentation of Blood Smears By Hierarchical Thresholding, Computer Vision, Graphics and Image Processing, vol. 25, No. 2, pp. 151–168, Feb. 1984.

Pal et al., Entropic Thresholding, Signal Processing, Netherlands, vol. 16, No. 2, pp. 97–108, Feb. 1989.

Vaidyanathan et al., Adaptive Image Analysis for Object Recognition Part 1—Entropic Object Location, IEEE, vol. 2, pp. 1888–1891, 1995.

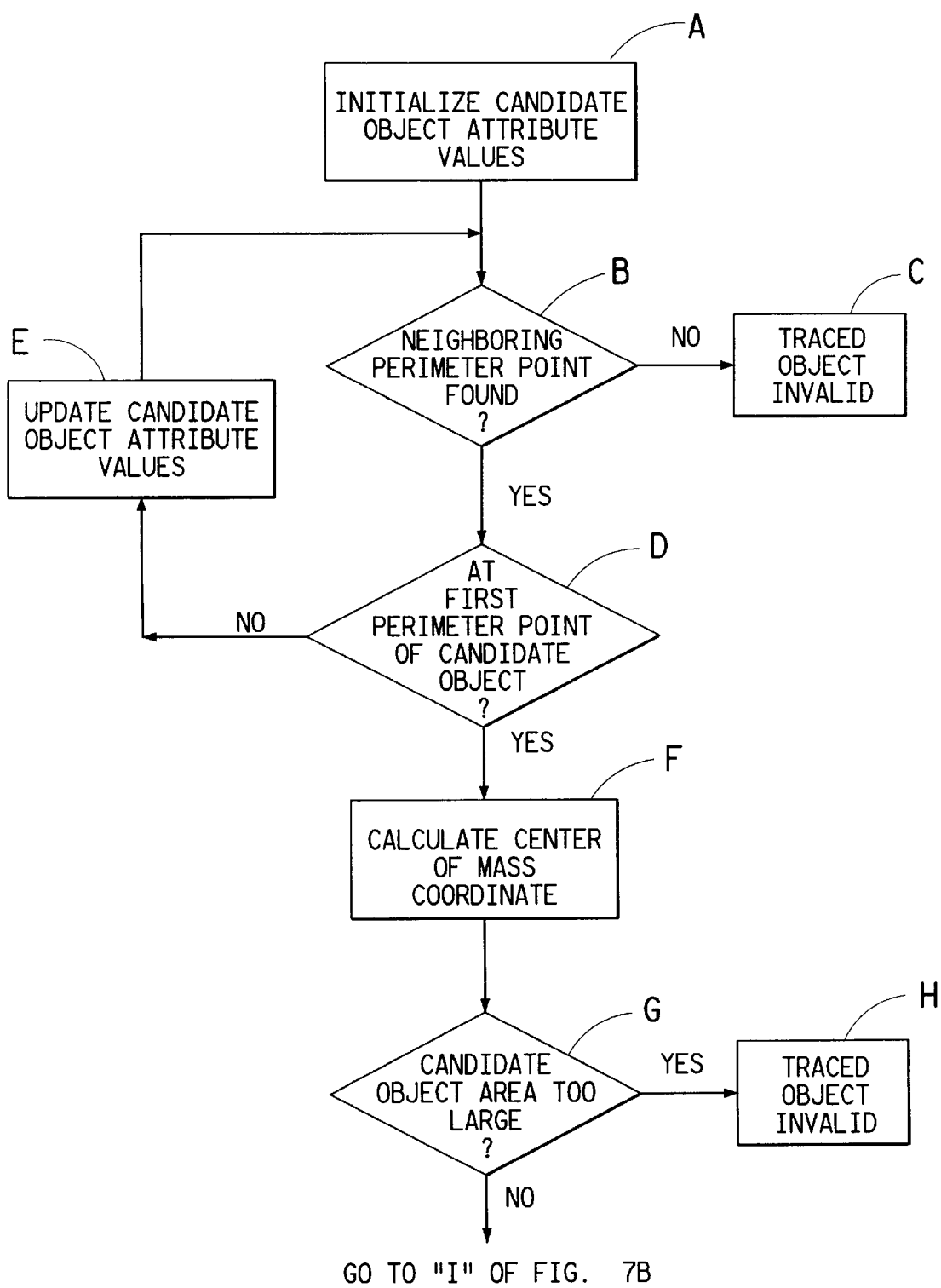

ADAPTIVE VISION SYSTEM USING DUAL THRESHOLDING

This application is a continuation-in-part of U.S. application Ser. No. 08/349,212, filed Dec. 5, 1994, now abandoned, which is a continuation-in-part of U.S. application Ser. No. 07/767,339, filed Sep. 27, 1991, now U.S. Pat. No. 5,481,620.

BACKGROUND OF THE INVENTION

1. Field of the Invention

The present invention relates to image analysis methods and systems for identifying objects in a background by selecting thresholds for a data space, generating a list of threshold pairs, using the threshold pairs to subdivide the data space into a plurality of sub-spaces, selecting at least one sub-space and multiply searching an image of the object and the background using each selected sub-space for a representation of a candidate object and validating the candidate object which has at least one predetermined attribute value of a valid object.

2. Description of the Related Art

Image analysis methods and systems, and more particularly, those methods and systems which recursively repeat the sequence of threshold selection and image searching for identifying objects in a background using thresholding are known in the art. For instance, published patent application WO 94/06562, teaches a method of entropically selecting a gray level threshold from a gray level histogram or a co-occurrence matrix, searching an image for candidate objects, validating the candidate objects, subdividing the histogram or the co-occurrence matrix and recursively repeating the threshold selection and searching steps of the method until a predetermined number of new valid objects is identified. In this published patent application, an image is recursively searched and individual thresholds are selected at each recursion.

Although thresholding is taught by WO 94/06562, the disclosure of this application is limited to entropic threshold selection combined with searching the image each time a new threshold is selected. Thus, in WO 94/06562, image searching is coupled to each threshold selection. Therefore, WO 94/06562 fails to find and identify certain valid objects under certain background conditions. Moreover, the selection of only individual thresholds increases the likelihood of selecting invalid objects.

By first selecting threshold pairs instead of individual thresholds before searching the image, a more comprehensive search of the data space of the image may be achieved, resulting in a higher likelihood that all possible objects will be found. Therefore, it would be desirable to separate the threshold selection step from the searching step, as well as to select threshold pairs as opposed to individual thresholds.

SUMMARY OF THE INVENTION

It is therefore an object of the present invention to provide a dual thresholding method which selects threshold pairs before an image is searched. The de-coupling of threshold selection from image searching allows a more comprehensive search of the data space of an image. In addition, as opposed to the prior art which selects individual thresholds, the additional threshold of the pair of the dual thresholding method of the present invention reduces the likelihood of selecting invalid objects.

It is an object of the present invention to provide a dual thresholding method which generates a list of ordered threshold pairs and which subdivides the data space into a plurality of sub-spaces by using the threshold pairs. At least one of these sub-spaces is selected, and the selected sub-space is used to search an image multiple times in order to identify valid objects.

In one specific implementation of the first embodiment, pairs of thresholds are selected by an entropic recursive method of automatic selection. The pairs of thresholds which are selected at each recursive cycle are subsequently used for searching an image multiple times in order to identify valid objects.

In another specific implementation of the first embodiment, the dual thresholding method of the present invention processes a set of archival images, keeping track of the threshold pair used to find each object. This data is used to correlate the threshold pair used to obtain each object trace to the classification of objects as either desired, i.e., valid, or not desired, i.e., non-valid, objects. For each threshold pair, the dual thresholding method of the present invention determines if most of the objects found are of a desired or a not desired class. The dual thresholding method then constructs a list of threshold pairs that preferentially identify valid objects. This new threshold list is then used in the future for identifying valid objects and resolving redundancies of such objects in other images.

It is an object of a second embodiment of the present invention to provide a dual thresholding method which selects a plurality of thresholds in a data space and which creates a list of all possible ordered pairs of the selected thresholds before searching the image. This method performs an even more comprehensive search of the data space of the image than the dual thresholding method of the first embodiment, resulting in an even higher likelihood of finding all possible objects in an image. In a first implementation of the second embodiment, the threshold pixel values in the data space are automatically selected, and a list of all ordered pairs of threshold pixel values is generated. In a second implementation of the second embodiment, the threshold pixel values are recursively selected, a list of all ordered pairs of threshold pixel values is generated, and the pairs of threshold pixel values are used as respective lower and upper delimiters to define data sub-spaces in which to search an image. The threshold pixel values are recursively selected by recursively partitioning the data space until a minimum pixel value partition width has been reached as a condition for terminating the recursive selection.

Additional object and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate the presently preferred embodiments of the invention and, together with the general description given above and the detailed description of the preferred embodiments given below, serve to explain the principles of the invention.

FIGS. 7A and 7B comprise a flow chart illustrating the steps of a module TRACE OBJECT which is used to trace and validate the candidate object.

DESCRIPTION OF THE PREFERRED EMBODIMENTS

Reference will now be made in detail to the present preferred embodiments of the invention as illustrated in the accompanying drawings.

Figure 1:
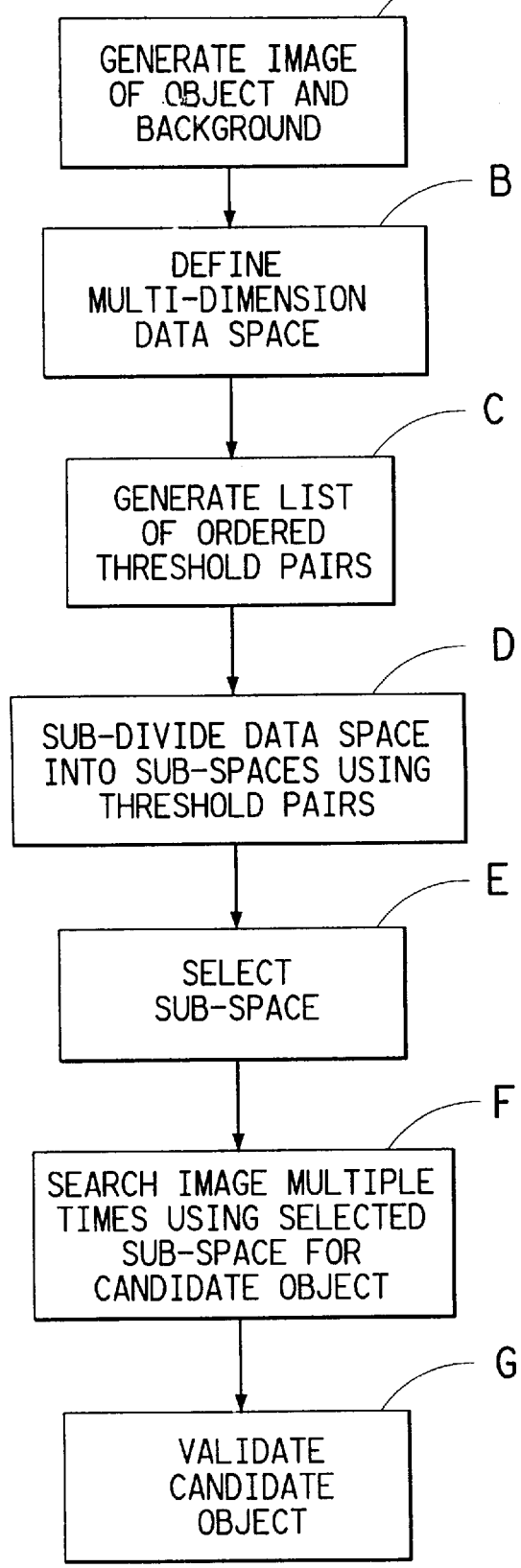
FIG. 1 is a block diagram showing the steps of the overall method according to a first embodiment of the present invention.

In accordance with a first embodiment of the present invention, there is provided a method of identifying at least one valid object in a background, where the valid object has at least one predetermined attribute value. FIG. 1 is a block diagram showing the overall methods of the first and second embodiments of the present invention, also referred to as a dual thresholding method.

The method of the present invention comprises the step of generating an image of the object and the background. An image is generated as shown in block A of FIG. 1. The hardware used to implement the method of the present invention must first be initialized when the image is generated. The image of the object and the background may be generated by a camera. Although a CCD camera is generally used with the present invention, any type of image generating apparatus may be used without departing from the general principles of the present invention. The image is then digitized and stored by a frame grabber or a video digitizer.

The method of the present invention also comprises the step of defining a data space representative of the image. This step is shown in block B of FIG. 1. The data space may be based on at least one predetermined attribute value of a valid object. Alternatively, the data space may be based on at least one predetermined attribute value of a previously identified object.

The term "pixel value", as used herein, encompasses both a single magnitude value, or multiple magnitude values, being associated with a single pixel. A pixel value having a single magnitude value associated with a pixel is known by the prior art term "gray level". In a single-valued "image space" or "data space", a single magnitude value or single "gray level" is associated with each pixel. An example of a "pixel value" having multiple magnitude values being associated with a single pixel is in a three-color (e.g., red, green, blue) image, where each "pixel value" may be comprised of a red magnitude, a green magnitude and a blue magnitude.

In the present invention, the data space may be a single-valued, or one dimensional data space, wherein a single magnitude value or single "gray level" is associated with each pixel. A histogram is an example of a single-valued data space constituting the gray level values associated with each point in the image. In this case, the data space comprises the pixel values of the image. This example will be described with respect to FIG. 2 below. Alternatively, the data space may be multi-dimensional, constituting the multiple-magnitude pixel values associated with each point in the image. This data space is advantageous, since a multi-valued data space contains more information about the object than a single-valued data space. An example of a multi-valued data space is a color space of the image. This color space may be the R,G,B color space, or the LAB color space. Such color spaces are examples of three-dimensional data spaces. Alternatively, the data space may comprise a space resulting from the transformation of pixel values of an image. This resulting space may be, for example, contrast, hue magnitude or edge intensity.

A "data space" of an image whose pixels are multi-valued may be considered to be comprised of multiple "data sub-spaces". Each "data sub-space" is thus a subset of the overall "data space". A first type of "data sub-space", which could also be called a "feature sub-space", is that wherein only a subset of the multiple magnitude values, or "pixel values", are associated with each pixel. For example, in a three-color (red, green, blue) image the "red data sub-space" would describe an image comprised of only the red pixel magnitudes from the original image and a "green-blue data sub-space" would describe an image comprised of only the pairs of green and blue pixel magnitudes from the original image.

A second type of data sub-space, which could also be called a "bounded interval data sub-space", is a bounded portion of the data space, that is, a data space having a reduced range of magnitude values for the pixels. For example, in a black and white image having pixel magnitude or intensity values ranging from 0 to 255, one such sub-space would be a sub-space defined by pixels having data values within the interval of 64 to 128. In a bounded data space, the first threshold of the pair is a lower delimiter (i.e., lower bound) and the second threshold of the pair is an upper delimiter (i.e., upper bound).

It should also be understood that these two types of sub-spaces can be combined to create a "combination sub-space". For example, in an image having magnitude or intensity values ranging from 0 to 255 and having three colors: red, green, and blue, one such combination sub-space would be a sub-space defined by red data values within the magnitude interval of 64 to 128. The term "data sub-space" as used herein may thus refer to either a "feature sub-space", a "bounded interval sub-space", or a "combination sub-space".

For single-dimensional data spaces the sub-spaces may be comprised of bounded portions of the data space, each sub-space having a reduced range of magnitude values for the pixels defined by a lower and an upper bound. For multi-dimensional data spaces the sub-spaces may be defined by subsets of the multi-dimensional magnitudes. Multi-dimensional data sub-spaces may be further defined by bounded portions of the data sub-space(s). The data spaces described herein are meant to be exemplary only, with the scope of the present invention extending beyond these examples.

In a first implementation of the first embodiment, pairs of thresholds are selected by an entropic recursive method of automatic selection. The pairs of thresholds selected for each recursive cycle are subsequently used for searching the image. This implementation, which uses entropically selected thresholds to define a single-valued data space, is illustrated with respect to FIGS. 2 and 3. As illustrated with respect to FIG. 2 in particular, the step of defining a data space comprises generating a pixel value histogram of the image, where the pixel value histogram has an entropy function. A module, HISTOGRAM, is used to generate the pixel value histogram of the region of interest of the image. The steps for generating the pixel value histogram are shown in the flow diagram of FIG. 2. As shown in block A of FIG. 2, HISTOGRAM first calculates a histogram of the region of interest of the image. It then calculates the values to be used subsequently in the calculation of the entropy function, $H_s$, for each pixel value, s, as shown in block B of FIG. 2. The results of this calculation are stored in a global look-up table as shown in block C. This ensures that for subsequent calculations of the entropic threshold pixel value, only a simple look-up operation is required.

The method of the present invention also comprises the step of generating a list of ordered threshold pairs. This step is shown in block C of FIG. 1. This list may be generated in a variety of ways. For instance, it may be desirable to use entropic thresholding and to generate a fixed a set of threshold pairs for the processing of the image to permit obtaining as many desired objects as possible, while as few non-desired objects as possible. This alternative will be described below with respect to FIG. 11.

Figure 11:
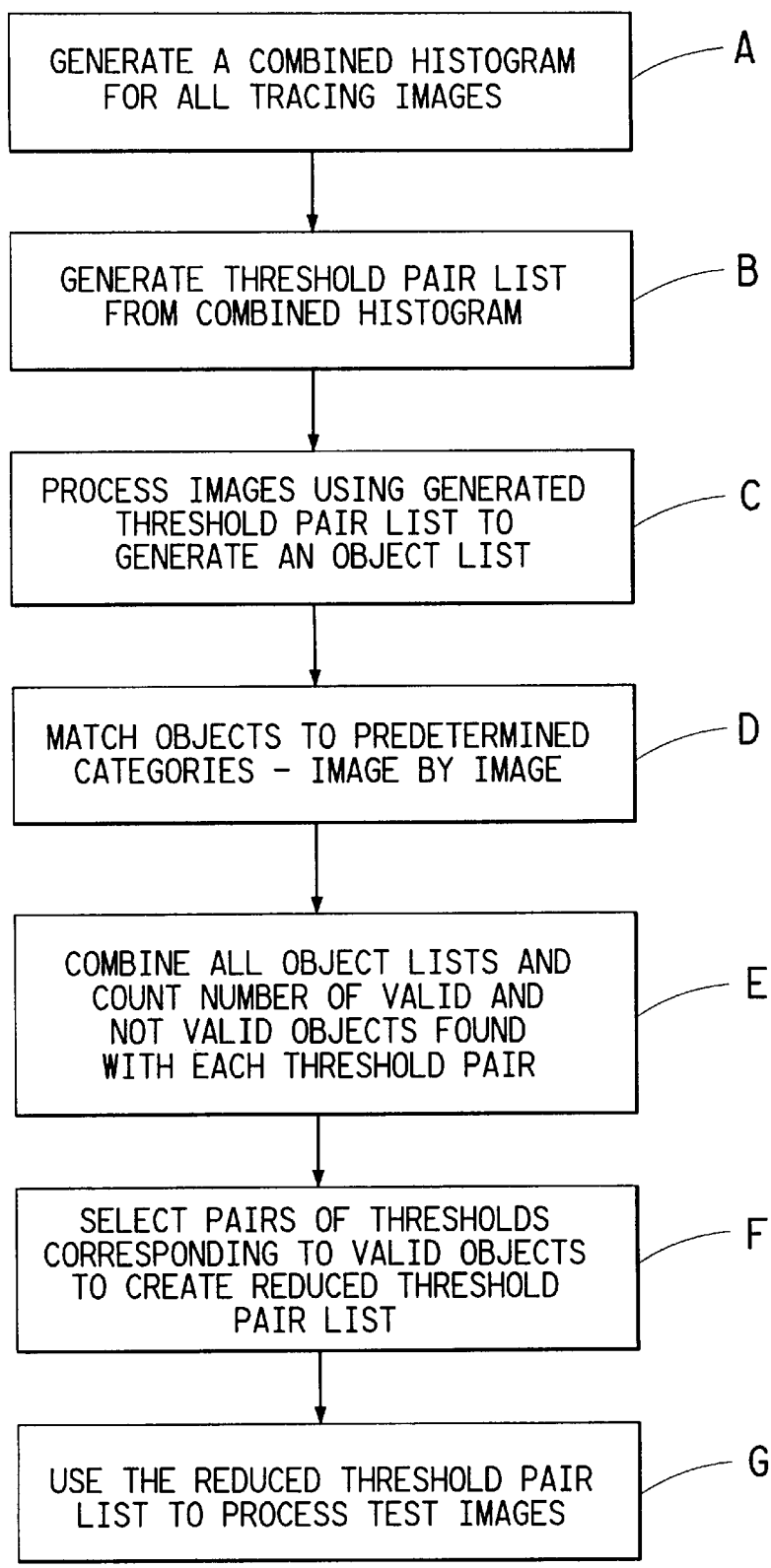
FIG. 11 is a flow chart showing the steps of a module which uses entropic thresholding and generates a fixed threshold list from which to select desirable threshold pairs.

The method of the present invention also comprises the step of using the threshold pairs to subdivide the data space into a plurality of sub-spaces. These sub-spaces are representative of the image generated. This step is shown in block D of FIG. 1. Several methods may be used to subdivide the data space, and thus define, the data sub-spaces. An initial set of candidate sub-spaces may be generated by: binary division of the pixel value space, as will be described in the second embodiment below with respect to FIG. 20; recursively generating a set of data sub-spaces from a single representative image as will be described with respect to FIG. 21; or constructing a combined histogram of a set of images and determining the set of data sub-spaces from that combined histogram. An entropic threshold version of this latter approach is illustrated in FIG. 11.

Figure 2:
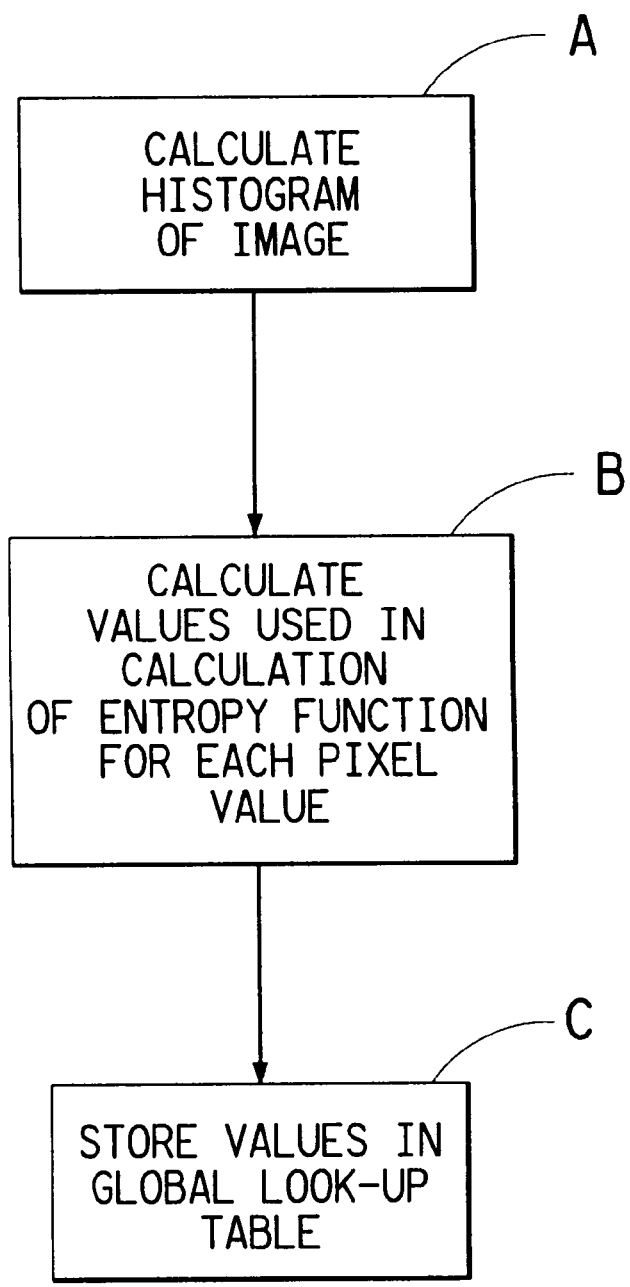
FIG. 2 is a flow chart illustrating the steps of a module HISTOGRAM which is used to generate a pixel value histogram of an image.
Figure 3:
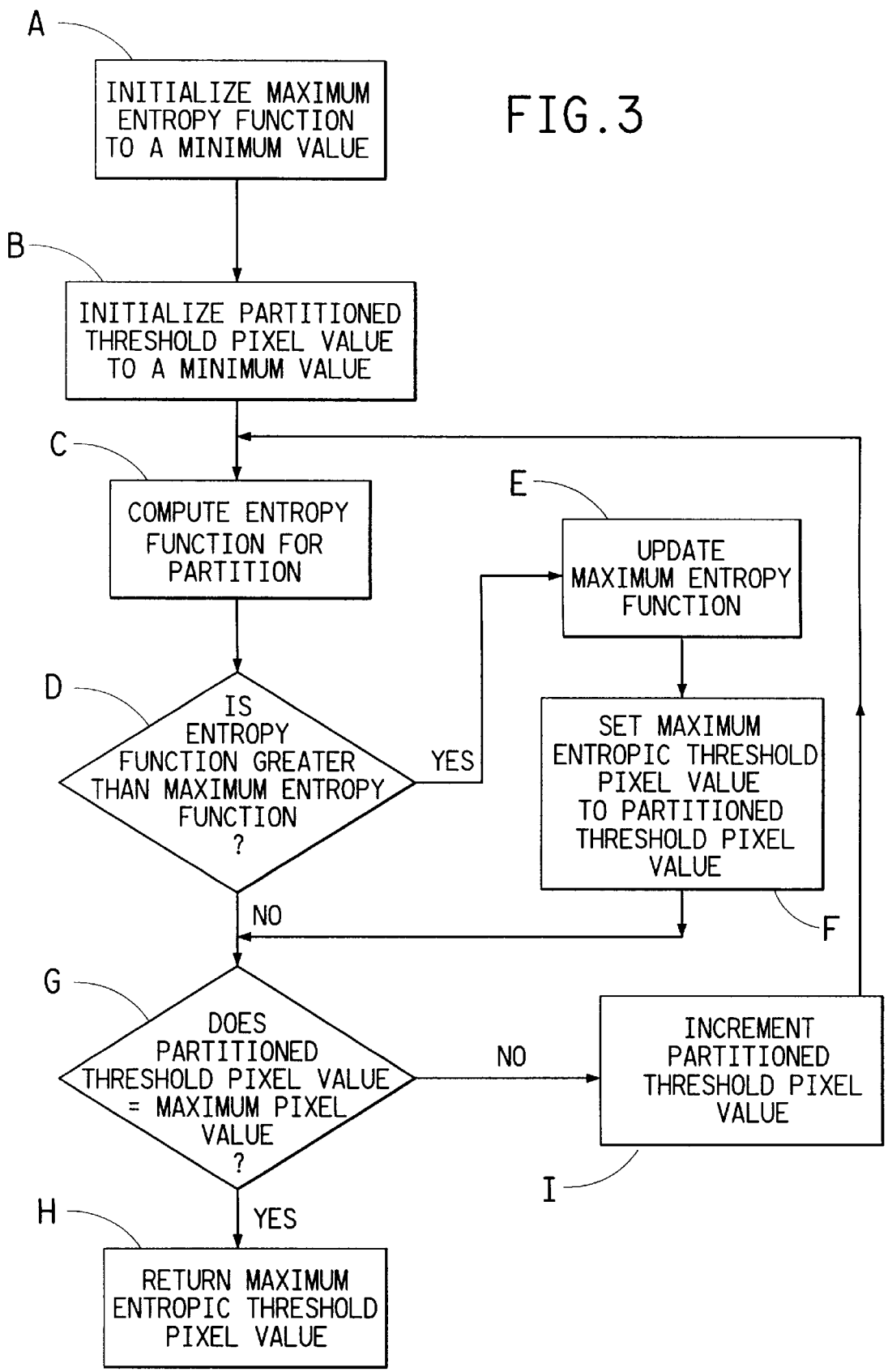
FIG. 3 is a flow chart illustrating the steps of a module ENTROPY which is used to entropically select a threshold pixel value such that the entropy function of the histogram is maximized.

The method of the present invention also comprises the step of selecting at least one of these sub-spaces. This step is shown in block E of FIG. 1. The sub-space is a bounded portion of the data space—i.e., it does not span the entire data space. The sub-space may be a range of pixel values defined by a pair of pixel values. Moreover, the sub-space may be selected based on a priori information, such as the way that for instance, pixel values, or color parameters, cluster in the respective spaces, although it should be noted that the sub-space is not limited to these examples. In the implementation as illustrated in FIG. 2, this step comprises entropically selecting a threshold pixel value such that the entropy function of the histogram is maximized. This step is performed by the ENTROPY module as shown in FIG. 3. As shown in block A of FIG. 3, the first step in maximizing the entropy function of the histogram is to initialize the maximum entropy function to a minimum value.

Figure 4:
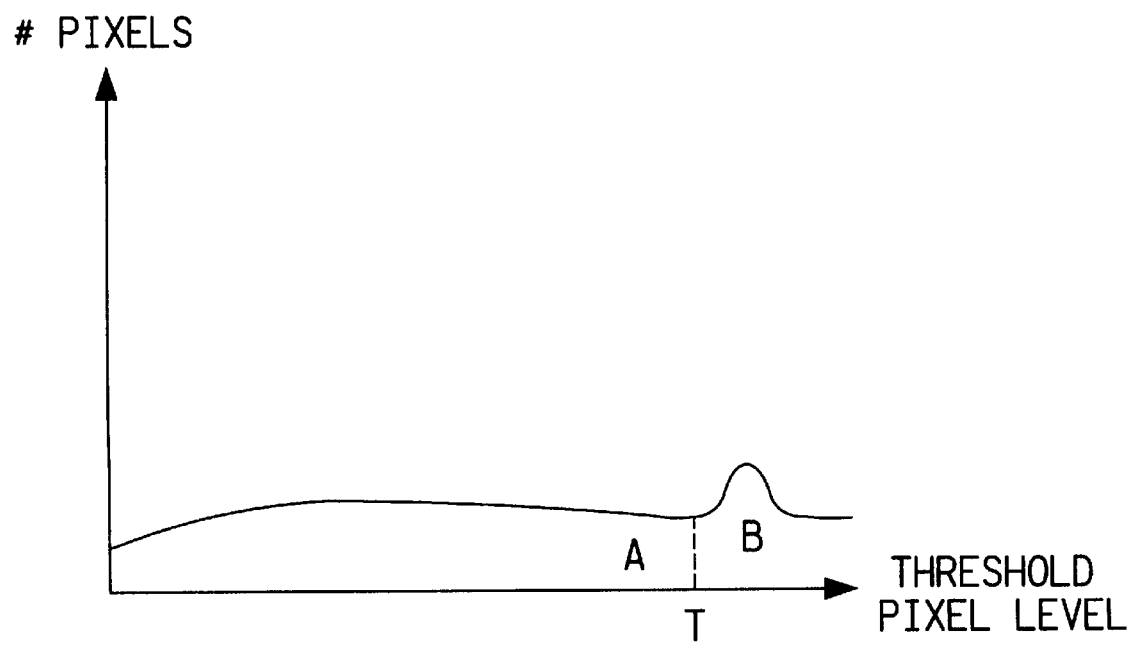
FIG. 4 is a pixel value histogram of an image of a single, simple object in a varying background.

In the entropically selected threshold implementation of the first embodiment, the step of entropically selecting a threshold pixel value includes the sub-step of sequentially partitioning the pixel value histogram at each pixel value into a first partition and a second partition. To illustrate the simple case where a single, simple object in a varying background is identified, a pixel value histogram of an image is shown in FIG. 4. The first and second partitions are shown in the histogram of FIG. 4, where the pixel values of the background are represented by a first partition A, and the pixel values of the valid object are represented by a second partition B. In the ENTROPY module the partitioned threshold pixel value is initialized to a minimum value as shown in block B of FIG. 3. The step of entropically selecting a threshold pixel value also includes the sub-step of computing the entropy function for each partition, where the total entropy function of the histogram is defined as the sum of the entropy function $H_s(A)$ of first partition, A, and the entropy function $H_s(B)$ of second partition. This step is shown in block C of FIG. 3 and can be mathematically expressed as follows:

For a given threshold gray level, $s_i$:

$$H_s(A) = -\sum_{i=1}^{s} \frac{p_i}{p_s} ln\left(\frac{p_i}{p_s}\right) \quad (1)$$

-continued $$\text{with } p_i = \frac{f_i}{N'} P_s = \frac{1}{N} \sum_{i=1}^{s} f_i \quad (2)$$

$$\text{Thus, } \frac{p_i}{p_s} = \frac{f_i}{\sum_{i=1}^{s} f_i} = \frac{f_i}{N_s} \text{ with } N_s = \sum_{i=1}^{s} f_i \quad (3)$$

$$\text{So, } H_s(A) = -\sum_{i=1}^{s} \frac{f_i}{N_s} \ln\left(\frac{f_i}{N_s}\right) = \frac{-1}{N_s} \sum_{i=1}^{s} f_i \ln f_i + \ln N_s \quad (4)$$

$$H_s(B) = \frac{-1}{N_s'} \sum_{i=s+1}^{N_{gray}} f_i \ln f_i + \ln N_s' \quad (5)$$

$$H_s(A) + H_s(B) = \ln N_s + \ln N_s' - \frac{1}{N_s} \sum_{i=1}^{s} f_i \ln f_i - \frac{1}{N_s'} \sum_{i=s+1}^{N_{gray}} f_i \ln f_i \quad (6)$$

The sum $H_s(A)+H_s(B)$ represents the total entropy function of the pixel value histogram of the image. The maximum entropic threshold pixel value is the value of s which maximizes the total entropy function.

Decision diamond D of FIG. 3 asks whether the entropy function of the histogram is greater than the maximum entropy function as initialized in block A. If it is, then the maximum entropy function is updated using the partitioned threshold pixel value as shown in block E of FIG. 3. The maximum entropic threshold pixel value is then set to the partitioned threshold pixel value as shown in block F. After the maximum entropy threshold pixel value has been set, or if the entropic function of the histogram is not greater than the maximum entropy function, then decision diamond G of the ENTROPY module as illustrated in FIG. 3 asks whether the partitioned threshold pixel value equals the maximum threshold pixel value. If so, the maximum entropic threshold pixel value is returned as shown in block H of FIG. 3. If not, then the partitioned threshold pixel value is incremented as illustrated in block I of FIG. 3, and the incremented partitioned threshold pixel value is returned to block C, where the entropy function of the incremented, partitioned threshold pixel value is computed. The loop through C–G is repeated until the partitioned threshold pixel value equals the maximum threshold pixel value, at which point the maximum entropic threshold pixel value is returned as shown in block H.

According to the present invention, in $H_s(A)$ and $H_s(B)$, the probability distributions are renormalized to include only the pixel values within each of the partitions. With this renormalization, the maximum entropy function occurs right at the edge of the object peak in the pixel value histogram as shown at T in FIG. 4. Thus, a new threshold pixel value is selected such that the entropy function of the histogram is maximized. With this maximum choice of threshold for the simple case as illustrated in FIG. 4, the renormalized distribution of the background becomes the least peaky and the most uniform. The total entropy function of the histogram is dominated by the entropy function of the background, since the number of pixel values in the background partition is much larger than the number of pixel values in the object partition.

Figure 5:
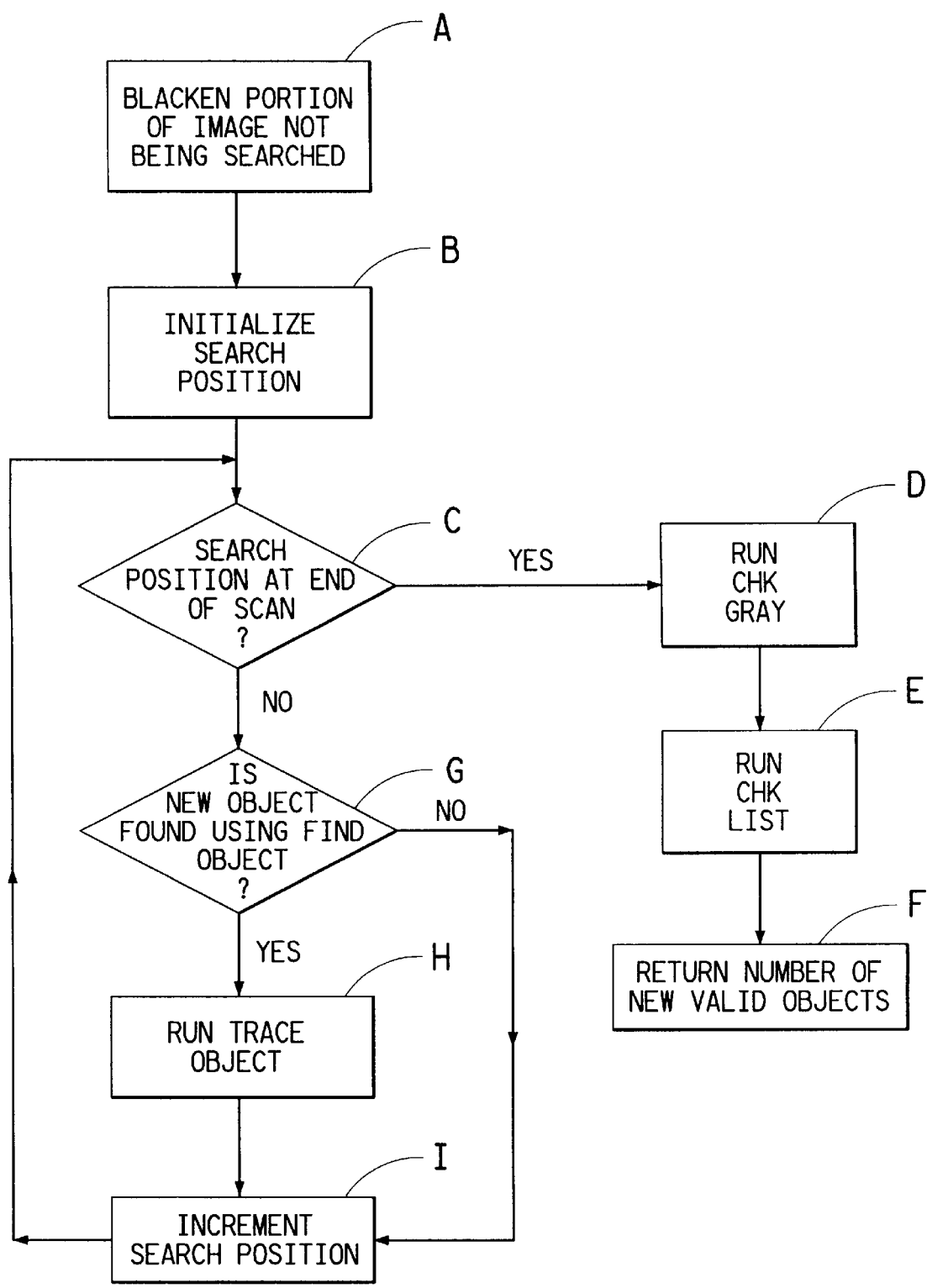
FIG. 5 is a flow chart illustrating the steps of a module SEARCH IMAGE which is used to search the image for at least one candidate object.

The method of the present invention also comprises the step of searching the image multiple times using each selected sub-space for at least one representation of a candidate object, wherein the candidate object has at least one predetermined attribute value. This step is shown in block F of FIG. 1. This step may comprise either scanning the image once using each of the sub-spaces simultaneously, or scanning the image multiple times using a selected sub-space for each scan. In the entropic thresholding implementation of the first embodiment, this step comprises searching the image for at least one candidate object, wherein the candidate object has at least one candidate object attribute value. The searching step includes the sub-steps of scanning the image for at least one candidate object using the entropically selected threshold pixel value and tracing the candidate object having boundary pixel values determined by the entropically selected threshold pixel value. The searching step is performed by a module SEARCH IMAGE as shown in FIG. 5, a module FIND OBJECT of FIG. 6, and a module TRACE OBJECT as shown in FIGS. 7A and 7B.

The method of the present invention also comprises the step of validating the candidate object having the predetermined attribute value to identify the valid object. This step is shown in block G of FIG. 1. The validating step includes the sub-steps of calculating the candidate object attribute values and comparing the candidate object attribute values to the valid object predetermined attribute values to validate candidate objects. The calculating sub-step further includes the sub-step of storing the candidate object attribute values. The validating step is performed by the TRACE OBJECT module. In the first embodiment of the present invention, TRACE OBJECT uses only size and shape factor as valid object predetermined attribute values. In general, other attribute values may be used for the valid object predetermined attribute values.

The present invention employs a driver and a kernel. The driver stores the attribute values of the valid object, where each value represents the definition of a valid object, e.g., edge contrast, area, shape, etc. The driver of the present invention is specific to a given application. In an object-oriented environment, it is straight-forward in many instances to describe an object via a list of attributes such as size, shape, color, etc. For more complex objects where a simple parametric description might not be possible, one could use a neural network in the driver to identify the object. Parameters derived from the candidate object can be fed into the neural network, which has been trained to recognize specific objects. At this point, the architecture of the present invention begins to resemble a neural vision architecture where there is a feedback loop between the brain and the eye. In the present invention, a high-order driver is intertwined with a lower-order kernel. In this case, a more complex description of the object in the driver is used to drive the searching process, which in turn identifies further candidate objects.

The driver drives the kernel. The kernel performs several functions. It calculates an entropically selected threshold pixel value, searches the image and calculates the attribute values for candidate objects. In addition, it performs a validity check on the candidate objects by comparing the attribute values of the candidate objects with the predetermined attribute values for the valid objects, which, as noted above, are contained in the driver. It also performs a redundancy check to prevent multiple identification of a valid object.

Figure 8:
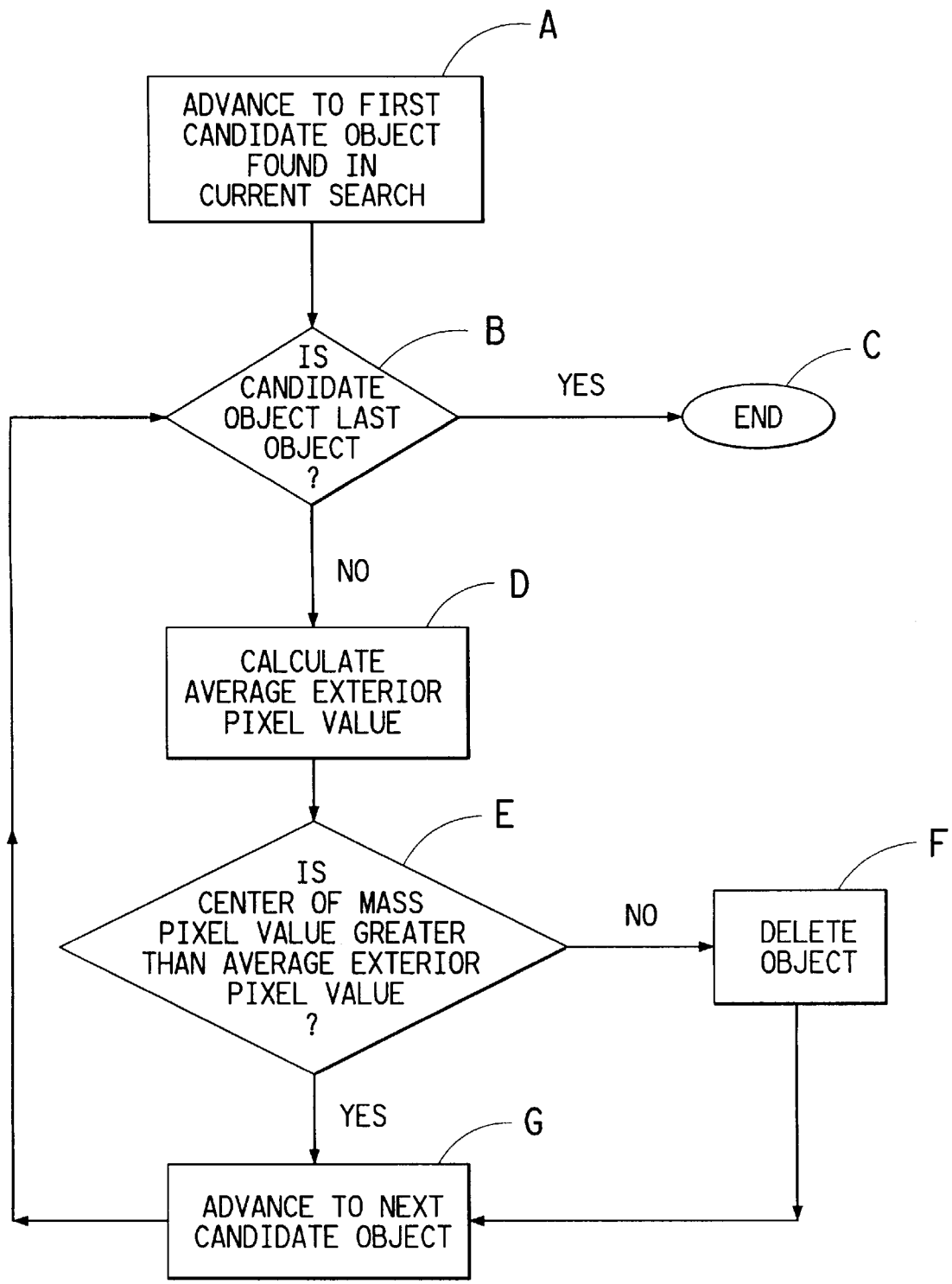
FIG. 8 is a flow chart illustrating the steps of a module CHK GRAY which is used to detect whether the candidate object is relatively lighter or darker than the background.

As illustrated by block A in FIG. 5, the first step in the SEARCH IMAGE module is to blacken a portion of the image not being searched. As shown in block B, the search position is then initialized. The module SEARCH IMAGE searches the region of interest with the current entropically selected threshold pixel value. Decision diamond C of FIG. 5 then asks whether the search position is at the end of the scan. If so, then a module CHK GRAY, which is shown in FIG. 8 in detail and which will be described in greater detail below, is run as illustrated in block D of FIG. 5. CHK GRAY retains only objects which are lighter than the background. To identify objects darker than the background, the image is inverted immediately after it has been generated. This allows CHK GRAY to retain objects which are darker than the background. Also, a module CHK LIST, which is shown in FIGS. 12A–12D and 14A–14B in detail and which also prevents multiple identification of a valid object, is run as illustrated in block E of FIG. 5. The number of new valid objects found by SEARCH IMAGE is returned as illustrated in block F of FIG. 5.

If the search position is not at the end of the scan, then the module SEARCH IMAGE searches the region of interest with the current entropically selected threshold pixel value until it finds a point which has a pixel value exceeding the entropically selected threshold pixel value using a module FIND OBJECT. Such a point might be the first point of a new candidate object. Decision diamond G of FIG. 5 asks whether a new candidate object has been found using the module FIND OBJECT. If so, FIND OBJECT checks to see if the object has already been traced in the current search. If the object has not already been traced in the current search, the module SEARCH IMAGE proceeds to trace the object by running the module TRACE OBJECT, which is shown in detail in FIGS. 7A and 7B as shown by block H of FIG. 5. After the object has been traced, the search position is incremented as illustrated in block I of FIG. 5. The loop through B–I is continued until the module SEARCH IMAGE is at the end of the search as indicated by decision diamond C of FIG. 5. Alternatively, if a new candidate object has not been found as indicated by decision diamond G, then the search position is incremented as illustrated in block I, thus by-passing the tracing step and the loop through C–I is continued until SEARCH IMAGE is at the end of the search.

Figure 6:
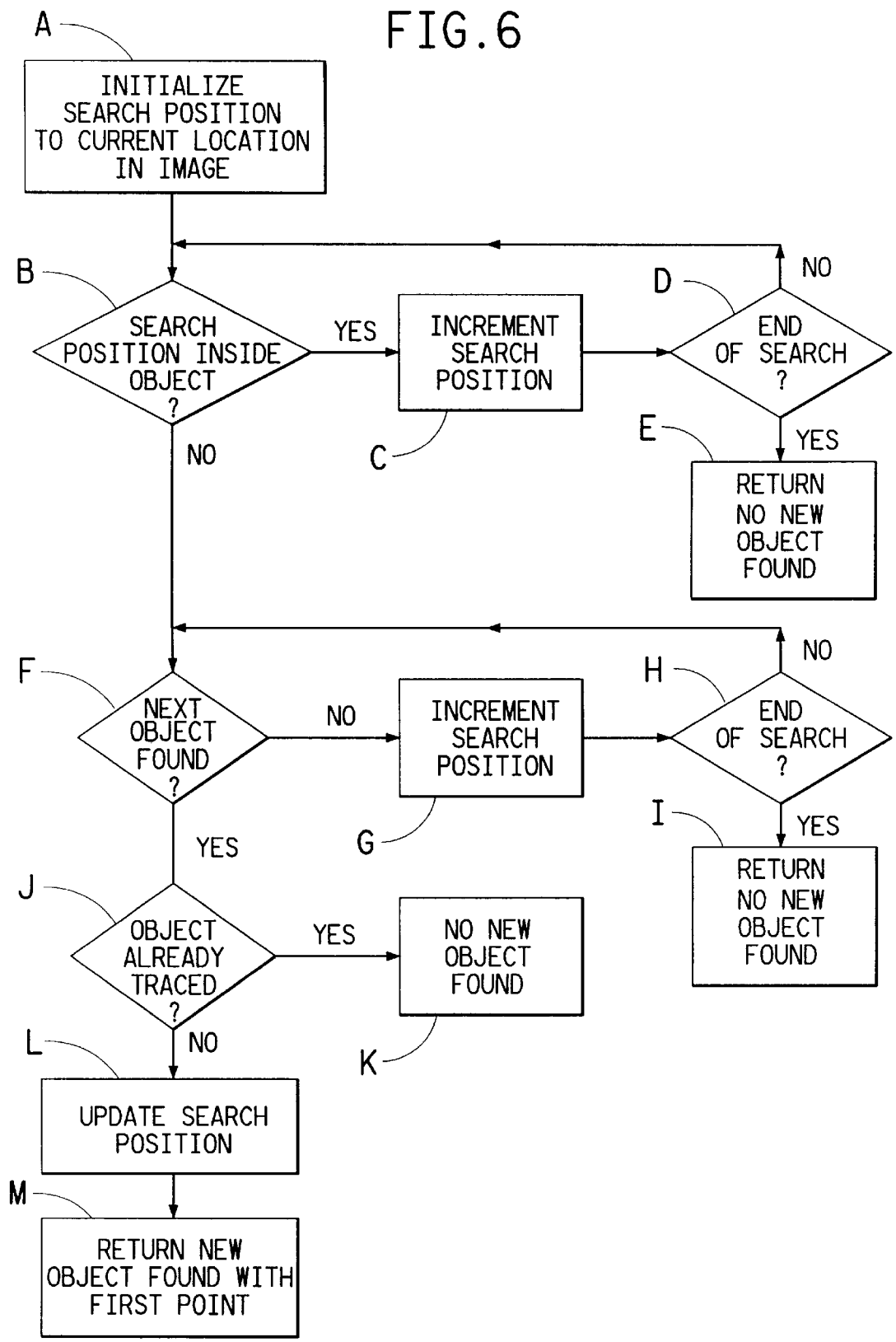
FIG. 6 is a flow chart illustrating the steps of a module FIND OBJECT which is also used to search the image.
Figure 7B:
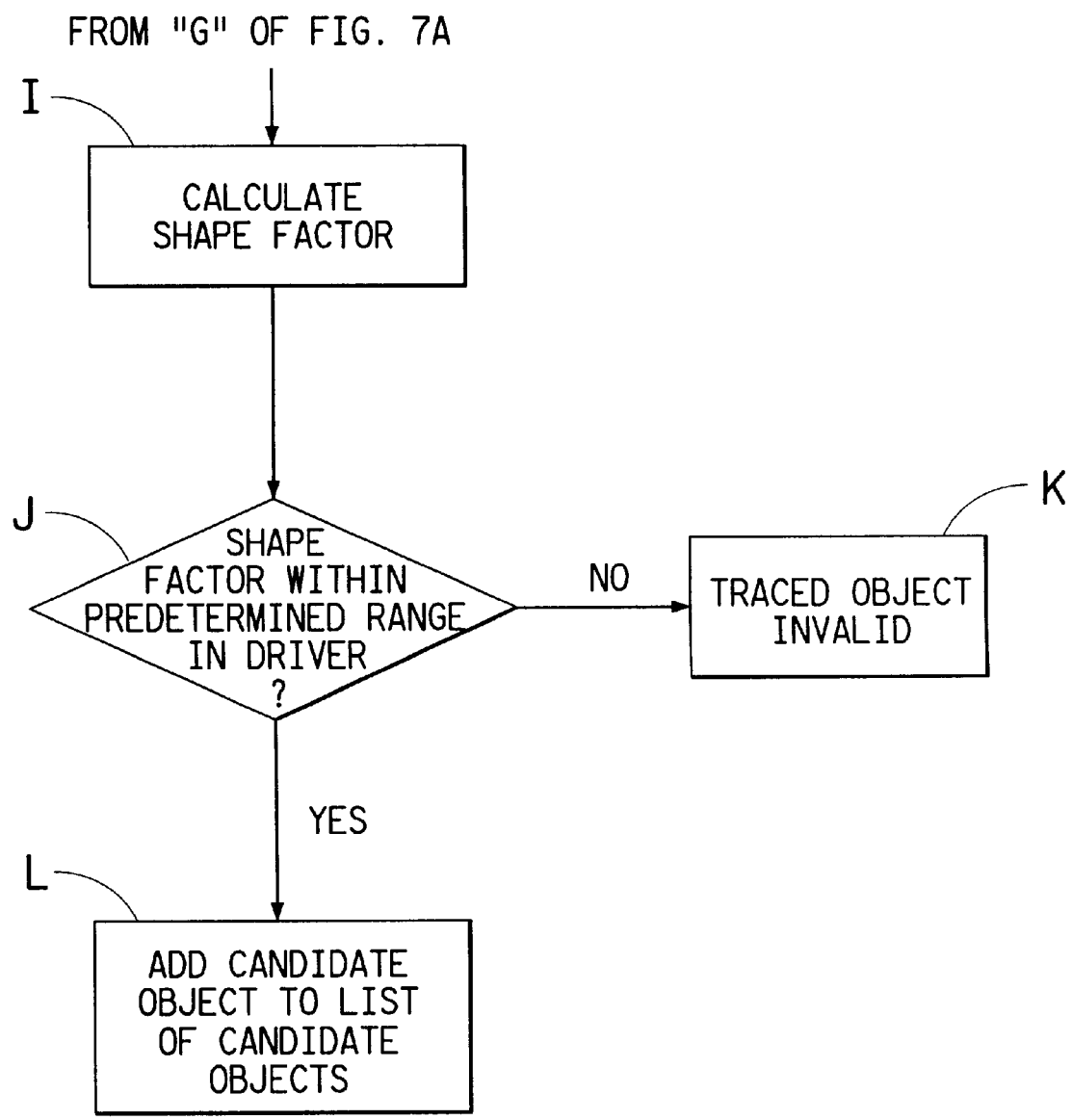

The steps of the module FIND OBJECT are illustrated in FIG. 6. The first step in FIND OBJECT is to initialize the search position to the current location of the image being searched as shown in block A. Decision diamond B then asks whether the search position is inside the object. If so, then the search position is incremented as illustrated by block C, and decision diamond D asks whether FIND OBJECT is at the end of its search. If so, then "NO NEW OBJECT FOUND" is returned as indicated in block E. If not, then decision diamond B asks whether the incremented search position is inside the object. This process of looping through B–E continues until the search position is not inside the object. At this point, decision diamond F asks whether a next object has been found. If not, then the search position is incremented as illustrated in block G of FIG. 6, and decision diamond H asks whether the SEARCH IMAGE is at the end of the search. If so, then "NO NEW OBJECT FOUND" is returned as indicated by block I. If not, then decision diamond F again asks whether a next object has been found using the incremented search position. This process of looping through F–I continues until a next object has been found. Decision diamond J asks whether the object which has been found has already been traced. If so, then "NO NEW OBJECT FOUND" is returned as indicated by block K. If the object which has been found has not already been traced, then the search position is updated as illustrated by block L, and a new object found is returned as indicated by block M of FIG. 6.

The steps of the module TRACE OBJECT are illustrated in FIGS. 7A and 7B. The basic principles of the TRACE OBJECT module are similar to those described in "Digital Image Processing" by Rafael C. Gonzalez and Paul Wintz, Second Ed., Addison-Wesley Publishing Company, Reading, Mass. (1987). As shown in block A of FIG. 7A, the first step in the TRACE OBJECT module is to initialize the candidate object attribute values. The TRACE OBJECT module then asks in decision diamond B whether a neighboring perimeter point has been found. If not, the traced object is invalid as illustrated by block C. If the neighboring perimeter point has been found, then decision diamond D asks whether the TRACE OBJECT module is at the first perimeter point of the candidate object. If not, then the candidate object attribute values are updated as illustrated in block E of FIG. 7A. The loop through B–E is then repeated using the updated candidate object attribute values until the TRACE OBJECT module is at the first perimeter point of the candidate object. The center of mass coordinate is then calculated as shown in block F of FIG. 7A. Decision diamond G then asks if the candidate object area is too large. If it is, the traced object is invalid as indicated by block H of FIG. 7A.

If the candidate object area is not too large, then a shape factor is calculated as shown in block I in FIG. 7B. The definition of the shape factor may vary, depending on the geometry of the object being identified. For instance, the definition of the shape factor for circular objects is:

$$\text{Shape Factor} = 1 - \frac{p^2}{4\pi A} \qquad (7)$$

Where:

p is the perimeter of a candidate object; and

A is the area of the candidate object.

TRACE OBJECT then checks if the shape factor is within a predetermined range as contained in the driver as shown in decision diamond J in FIG. 7B. If the shape factor does not fall within the predetermined range, then the traced object is invalid as illustrated by block K of FIG. 7B. If the shape factor falls within the predetermined range, then the candidate object is added to the list of valid objects maintained by the kernel as shown by block L.

After all the candidate objects have been traced in the current search, the module CHK GRAY as shown in FIG. 8 is called to check whether the candidate objects are relatively lighter than the background. As shown in block A of FIG. 8, the first step in the CHK GRAY module is to advance to the first candidate object found in the current search. Decision diamond B of FIG. 8 asks whether the candidate object is the last object in the list of candidate objects. If it is, the module stops running as shown by oval C. If the candidate object is not the last object in the list of candidate objects, then the average exterior pixel value is calculated as illustrated by block D. Decision diamond E then asks whether the pixel value of the center of mass is greater than average exterior pixel value of the four exterior points (i.e., the top, bottom, left and right points) surrounding the extremum points of the object. The exterior points are those points in the background which are immediate neighbors to the extremum points of the object. If not, the object is deleted as shown in block F of FIG. 8. If the pixel value center of mass is greater than the average exterior pixel value, then the candidate object is retained and the CHK GRAY module advances to the next candidate object as shown in block G. The CHK GRAY module then returns to decision diamond B to ask whether the candidate object is the last object. The loop as shown in B–G is repeated for the next candidate object until the next candidate object is the last candidate object, at which point CHK GRAY stops running. As noted above, the module CHK GRAY may be run to detect objects darker than the background. In this case, the image is initially inverted prior to performing the step of generating the image of the object and the background.

The method as described thus far can be referred to as a screening process. For example, it can be used to screen for the presence of pathological bacteria in food or in blood or soil samples. A screening process results in a yes—no answer; absolute quantification is not necessary. For a more stringent identification process, it is necessary to implement the method of the present invention recursively as described below.

The step of subdividing the data space may include subdividing the data space into an upper sub-space and a lower sub-space. In this case, the subdividing, selecting, searching and validating steps are then recursively repeated. By "recursion" is meant the process of continuously dividing a data space into an upper and a lower sub-space, searching each upper sub-space, which upper sub-space is itself continuously divided into upper and lower sub-spaces, for new valid objects until the number of new valid objects found in an upper sub-space is less than or equal to a predetermined minimum number, and subsequently searching each lower sub-space corresponding to the most recently searched upper sub-space, which lower sub-space is itself continuously divided into upper and lower sub-spaces, until the number of new valid objects found in a lower sub-space is less than or equal to the predetermined minimum number. This concept will be illustrated with respect to FIGS. 9A–9C below for a histogram. The repetition of the selection step selects a next successive sub-space, thereby recursively partitioning the data space until a condition for terminating the multiple searching has been reached. The terminating condition may be that a predetermined minimum number of new valid objects is identified. This predetermined minimum number may be greater than zero, or may be zero.

In the entropic thresholding implementation of the first embodiment, the subdividing step comprises subdividing the pixel value histogram into an upper histogram and a lower histogram using the entropic threshold pixel value which was selected to maximize the entropy function of the histogram. In this case, the subdividing, selection, searching and validating steps are recursively repeated. By recursion is meant the process of continuously dividing a histogram into upper and lower histograms, searching each upper histogram, which upper histogram is itself continuously divided into upper and lower histograms, for new valid objects until the number of new valid objects found in an upper histogram is less than or equal to a predetermined minimum number, and subsequently searching each lower histogram corresponding to the most recently searched upper histogram, which lower histogram is itself continuously divided into upper and lower histograms, until the number of new valid objects found in a lower histogram is less than or equal to the predetermined minimum number. The repetition of the selection step selects a next successive entropic threshold pixel value, thereby recursively partitioning the pixel value histogram to identify the valid objects until a predetermined minimum number of new valid objects is identified. In one case, the predetermined minimum number is zero. However, there may be cases where the predetermined number is greater than zero, such as when a complete identification is not required.

Figure 9A:
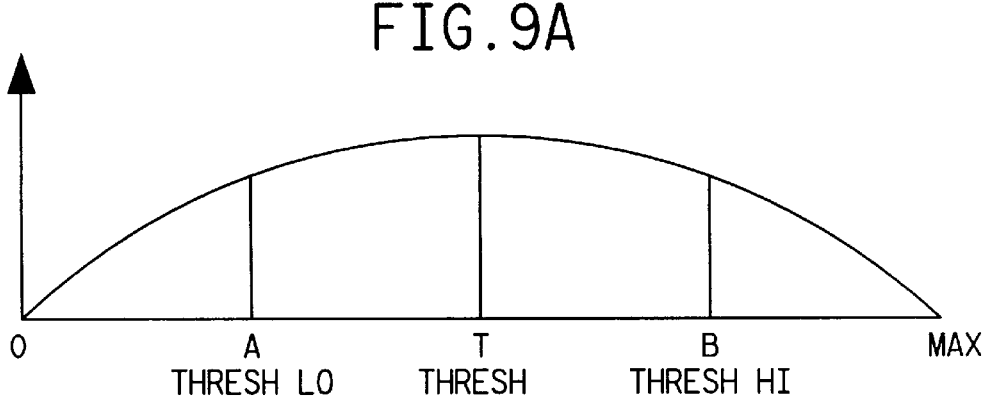
FIGS. 9A–9C are original, upper and lower pixel value histograms, respectively, of an image.
Figure 9B:
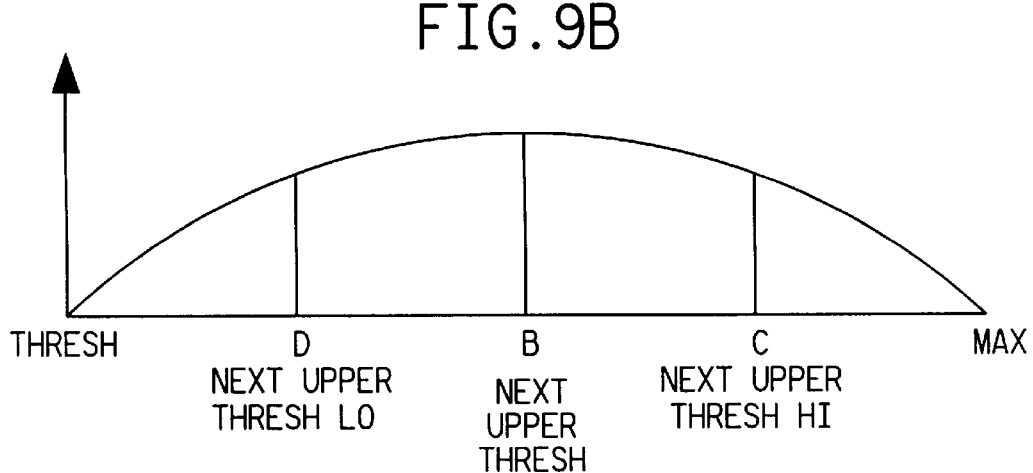
Figure 9C:
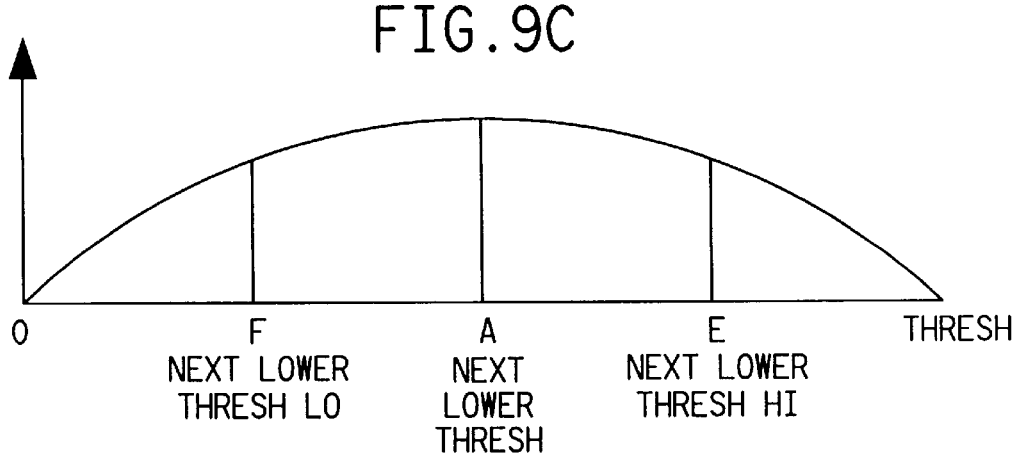

FIGS. 9A–9C illustrates the concept of subdividing a histogram into an upper histogram and a lower histogram. An original histogram is shown in FIG. 9A. THRESH, as shown at T in FIG. 9A, is the entropically selected threshold pixel value for the pixel value histogram corresponding to the pixel value region between the minimum pixel value being searched and the maximum pixel value being searched. For the original histogram as shown in FIG. 9A, the minimum pixel value being searched is zero and the maximum pixel value being searched is MAX. THRESH HI, as shown at B, is the entropically selected threshold pixel value for the pixel value histogram corresponding to the pixel value region between THRESH and MAX. THRESH LO, as shown at A, is the entropically selected threshold pixel value for the pixel value histogram corresponding to the pixel value region between zero and THRESH.

The upper histogram is shown in FIG. 9B. The repetition of the subdividing step subdivides the upper histogram into a next successive upper and lower histogram as shown in FIG. 9B. The repetition of the selection step for the upper histogram selects a next upper successive entropic threshold pixel value, as shown at B in FIG. 9B. Thus, point B, which was THRESH HI in the original histogram, becomes the threshold for the upper histogram, or NEXT UPPER THRESH. In FIG. 9B, the minimum pixel value being searched is now THRESH and the maximum pixel value being searched is now MAX. The NEXT UPPER THRESH HI, shown at C, is the entropically selected threshold pixel value for the pixel value histogram corresponding to the pixel value region between B and MAX. The NEXT UPPER THRESH LO, shown at D, is the entropically selected threshold pixel value for the pixel value histogram corresponding to the pixel value region between THRESH and B. The selection, searching and validating steps are then repeated recursively using the next upper successive entropic threshold pixel value, B, as the entropic threshold pixel value.

FIG. 9C shows the lower histogram. The repetition of the subdividing step subdivides the lower histogram into a next successive upper and lower histogram as shown in FIG. 9C. The repetition of the selection step for the lower histogram selects a next lower successive entropic threshold pixel value, as shown at A in FIG. 9C. Thus, point A, which was THRESH LO in the original histogram, becomes the threshold for the partitioned lower histogram, or NEXT LOWER THRESH. In FIG. 9C, the minimum pixel value being searched is now zero and the maximum pixel value being searched is now THRESH. The NEXT LOWER THRESH HI, shown at E, is the entropically selected threshold pixel value for the pixel value histogram corresponding to the pixel value region between A and THRESH. The NEXT LOWER THRESH LO, shown at F, is the entropically selected threshold pixel value for the pixel value histogram corresponding to the pixel value region between zero and A. The selection, searching and validating steps are then repeated recursively for the lower histogram using the next lower successive entropic threshold pixel value, A, as the entropic threshold pixel value.

Figure 10:
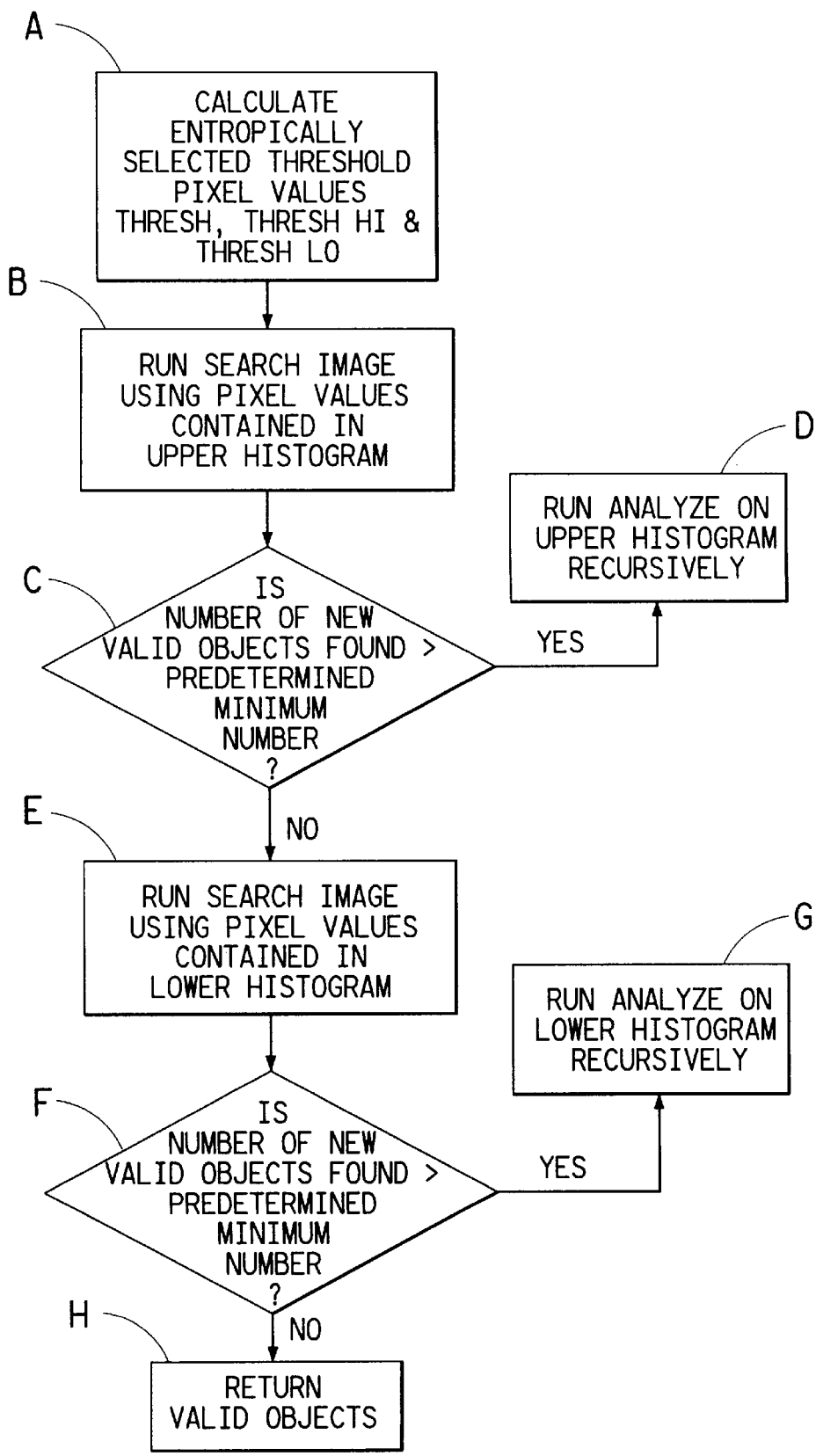
FIG. 10 is a flow chart illustrating the steps of a module ANALYZE which is used to recursively search the image for candidate objects.

The ANALYZE module as shown in FIG. 10 constitutes the core recursive kernel of the present invention and recursively partitions the histogram. The ANALYZE modules effectively zooms in on a specific region in pixel value space to search for instances of the candidate object. The first step in the ANALYZE module as shown in FIG. 10 is to calculate the entropically selected threshold pixel values THRESH, THRESH HI AND THRESH LO as described above and as shown in block A of FIG. 10. As shown in block B, the module SEARCH IMAGE is run using the pixel values contained in the upper histogram. Decision diamond C then asks whether the number of new valid objects found is greater than the predetermined minimum number. If it is, then the module ANALYZE is run on the upper histogram recursively. If the number of valid objects found is not greater than the predetermined minimum number, then the module SEARCH IMAGE is run again using the pixel values contained in the lower histogram as shown in block E. Decision diamond F then asks whether the number of new valid objects found is greater than the predetermined minimum number. If it is, then ANALYZE is run on the lower histogram recursively as shown in block G. If it is not, then ANALYZE stops running, and the valid objects are returned as shown in block H of FIG. 10. With the method of the present invention, there is some latitude in selecting the range of values of the number of attributes to be checked for in the validation step during the recursive process.

FIG. 11 is a flow chart illustrating the steps of an a priori dual thresholding method according to the first embodiment, where at least one valid object having at least one predetermined attribute value based on at least one predetermined attribute value of a previously identified object in a background. The method comprises the step of generating a set of training images in a background. The set of training images comprises a set of images representative of images for which object identification and categorization are desired. The method of the first embodiment also comprises the step of generating a set of testing images in another background. The set of testing images comprises images, again representative of images for which application of this method is desirable, but not part of the training image set. It is typical to use multiple testing images, such as a set of testing images, and a set of training images, but only a single testing image is really needed. However, more than one training image is needed. Testing images are typically generated at the same time as the training images, but they could be generated earlier or later, as long as they are representative of the images to be searched.

A data space, which is representative of the set of training images, is then generated. The data space comprises a plurality of sub-spaces which are defined by a list of threshold pairs. As shown in block A of FIG. 11, a combined histogram for all training images is generated, which is used to define a data space representative of the image. The combined histogram is generated as described above with respect to FIGS. 9A–9C. The valid objects in these images should be manually counted and marked by category to assist in judging the accuracy of the method. As shown in block B of FIG. 11, a threshold pair list is then generated from the combined histogram, for example, using entropic thresholding. The set of training images is then processed using the generated threshold pair list in order to obtain an object list as shown in block C. By "processing" is meant that the set of training images is searched multiple times, once in each selected data sub-space, to generate a plurality of representations of candidate objects, where each candidate object has at least one predetermined attribute value. The list includes threshold pairs which generate an object trace. The objects are then matched to predetermined categories, image by image, or sequentially, as shown in block D, i.e., the candidate objects having the predetermined attribute values are validated to identify at least one valid object for the set of images, wherein each valid object has a data sub-space associated therewith. Thus, each image has its own list of objects as shown in block C; each object is matched to a category in block D. All object lists are then combined as shown in block E. The number of desired (i.e., valid) and not-desired (i.e., non-valid) objects found with each threshold pair is then counted, as also shown in block E.

A reduced set of data sub-spaces is then defined by generating a reduced-size list of the ordered threshold pairs that correspond to each valid object for the set of training images. This step is shown in block F of FIG. 11. A data space which is representative of the set of testing images is then defined. This data space is then subdivided into a reduced set of data sub-spaces corresponding to each valid object by using the reduced size list of threshold pairs. As shown in block G, the reduced threshold pair list is then used to process test images in order to confirm the method performance, or new images for which automatic object classification is desired. By "processing" is meant that the set of testing images is searched multiple times, once in each data sub-space of the reduced set of data sub-spaces, to generate a plurality of representations of at least one candidate object, where the candidate object has at least one predetermined attribute value. This predetermined attribute value is the same as the at least one predetermined attribute value of a previously identified object in the set of training images. The at least one candidate object having the valid object predetermined attribute value is then validated.

According to the method of the present invention, the validating step further includes the sub-step of checking for redundancies to prevent multiple identification of the valid object. The redundancy checking sub-step is performed by calculating the candidate object attribute values for each selected representation and comparing the candidate object attribute values in the selected representation to the valid object predetermined attribute values to identify the valid object. Such redundancy checking is necessary since an object which has been recognized as valid after the current search may have been recognized as a valid object in an earlier search. In order to perform the redundancy checking sub-step, valid objects are classified as either homogeneous or inhomogeneous. Valid objects are also further classified as either a relatively large valid object or a small valid object. In addition, valid objects are classified as either contained in another valid object (interior valid objects), or never contained in another valid object (exterior valid objects).

According to the dual thresholding method of the present invention, the redundancy checking sub-step may be performed to delete inhomogeneous valid objects. When it is, the method of the present invention further includes the sub-step of deleting the large object when the large object contains more than one small object. Also, when the redundancy checking sub-step is performed to delete inhomogeneous valid objects, the method of the present invention also includes the sub-steps of calculating the average edge contrast of the large and the small valid objects and deleting the object having the smaller edge contrast when the large object contains only one small object. These sub-steps are performed by a module, CHK LIST, as shown in FIGS. 12A–12D for inhomogeneous valid objects.

Figure 12A:
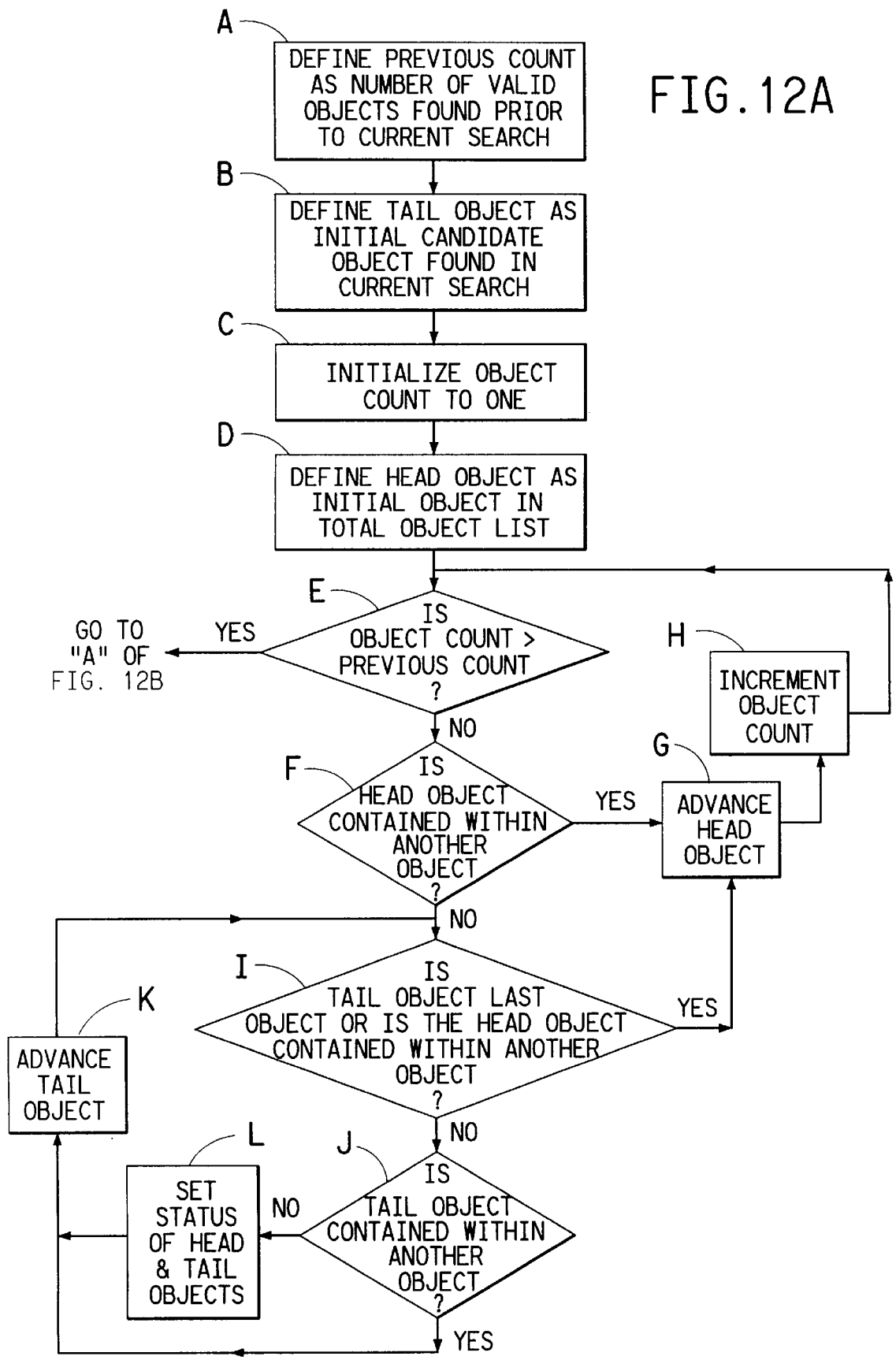
FIGS. 12A–12D comprise a flow chart illustrating the steps of a module CHK LIST which is used to resolve redundancies in inhomogeneous objects.

As shown in block A of FIG. 12A, the first step of the CHK LIST module for deleting inhomogeneous objects is to define the previous count as the number of valid objects found prior to the current search. Then the tail object is defined as the initial candidate object found in the current search as shown in block B. The object count is initialized to one as shown in block C, and the head object is defined as the initial object in the total object list (i.e., the list of all objects found to date) as shown in block D. Decision diamond E asks whether the object count is greater than the previous count.

Figure 12B:
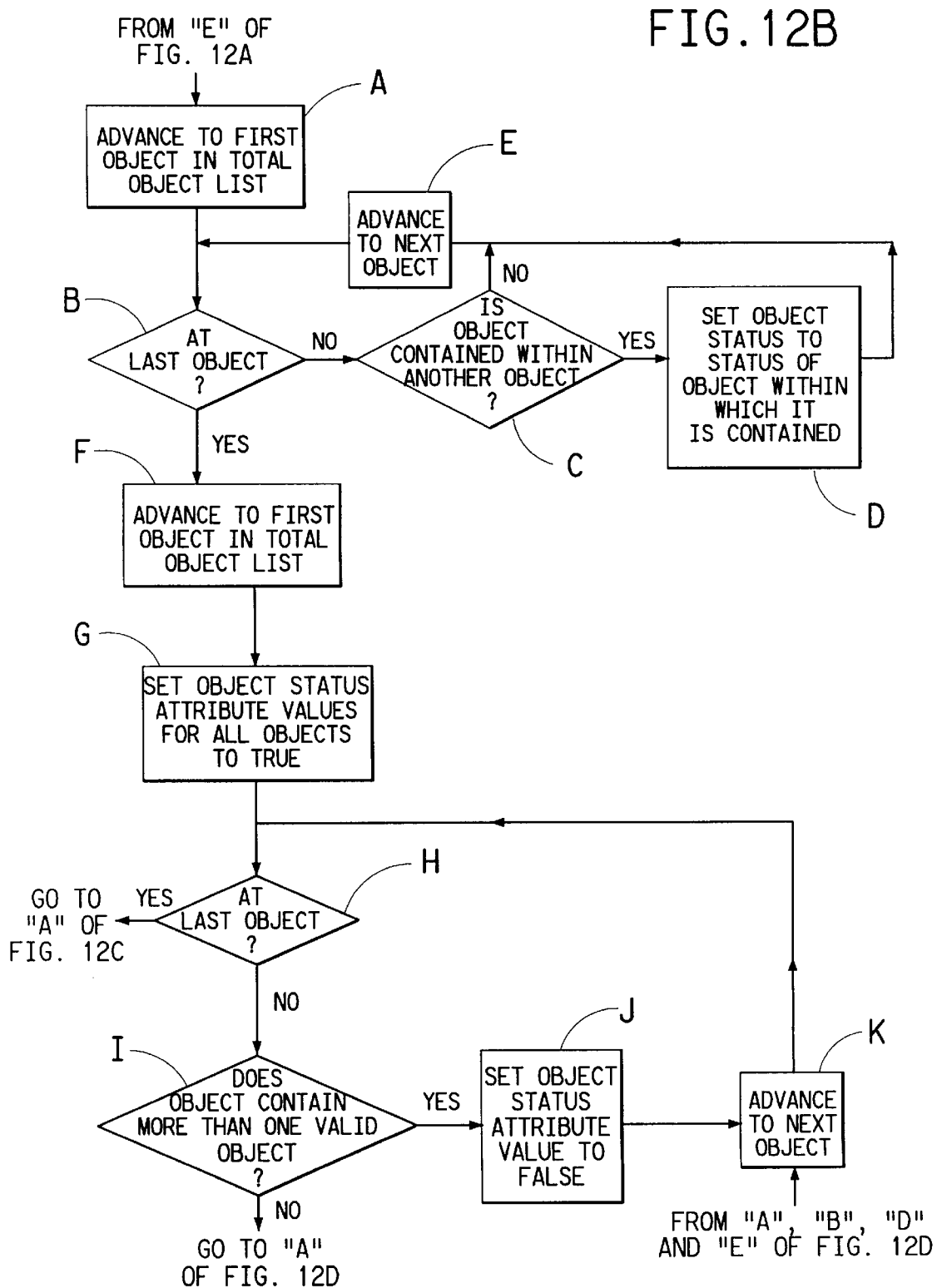
Figure 12C:
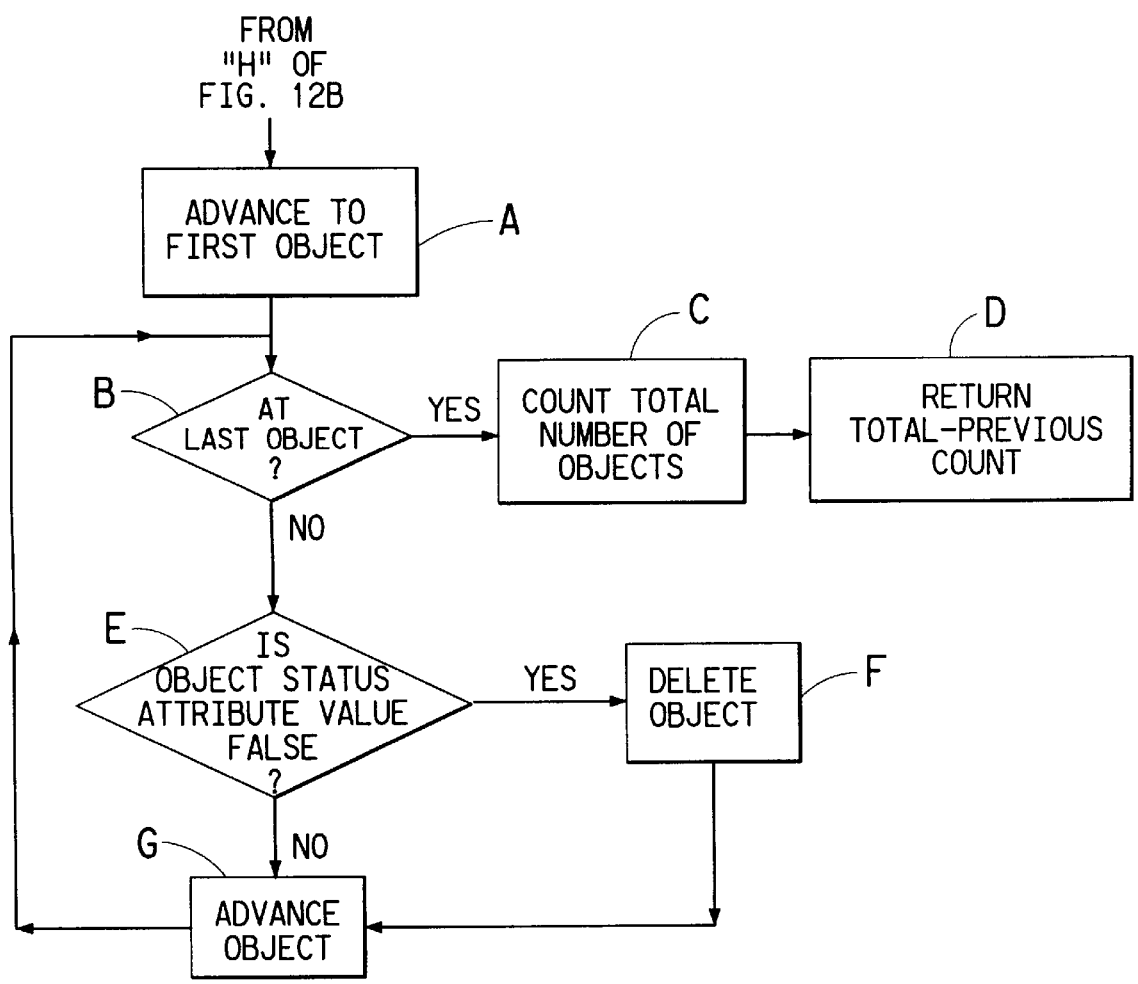
Figure 12D:
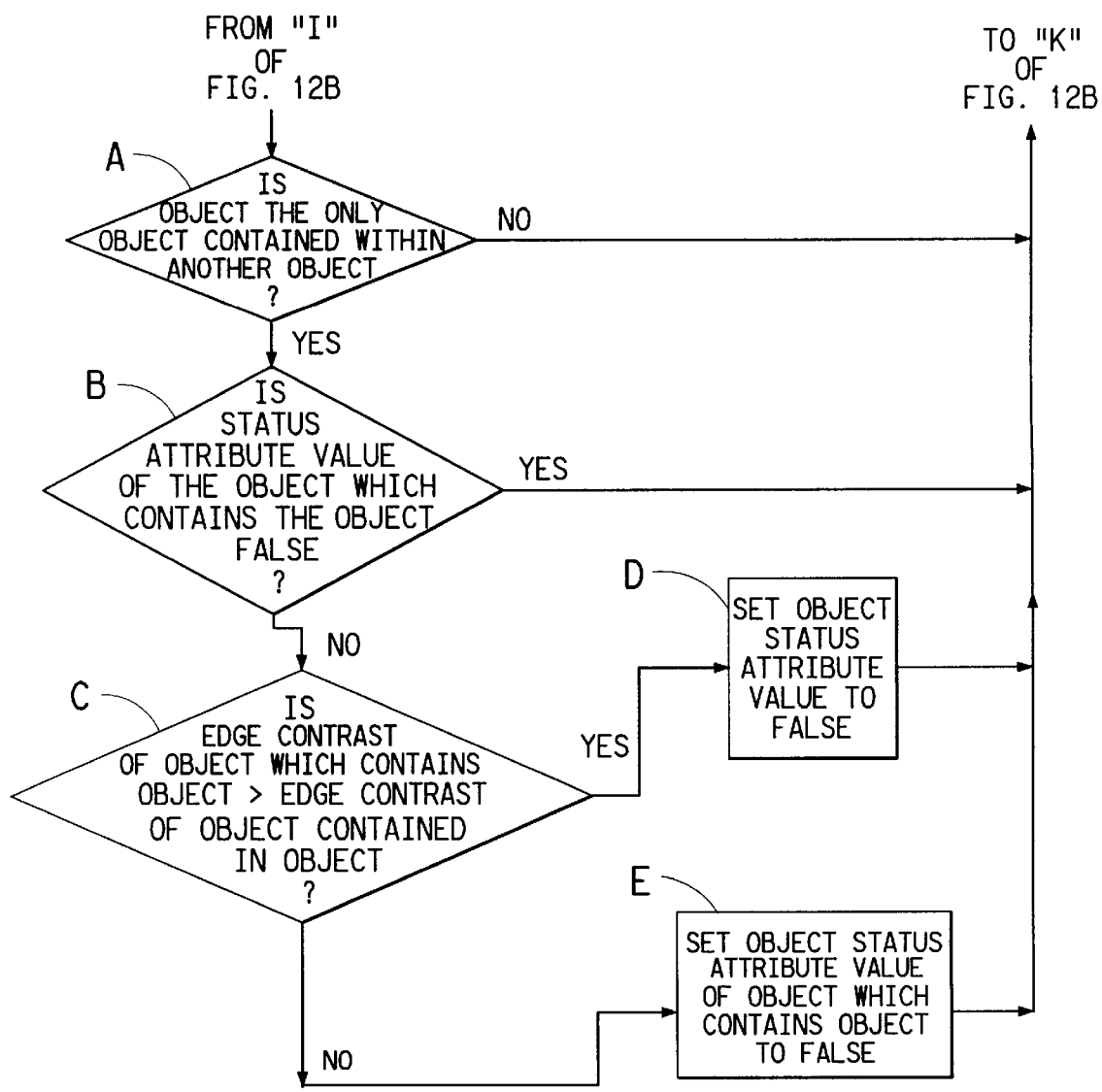

If the object count is greater than the previous count, CHK LIST advances to the first object in the total object list as shown in block A of FIG. 12D. Decision diamond B of FIG. 12B asks if CHK LIST is at the last object. If not, then decision diamond C asks whether the valid object is contained within another valid object. If so, the object status is set to the status of the object within which it is contained as shown in block D, and CHK LIST advances to the next object as shown in block E. Also, if the object is not contained within another object, then CHK LIST advances to the next object as shown in block E. The loop through B–E continues until the next object of block E is the last object, at which point CHK LIST advances to the first object in the total object list as shown in block F. The object status attribute values for all the objects is set to "TRUE" as shown in block G. "TRUE" in this context means valid, and "FALSE" means invalid. Decision diamond H then asks if CHK LIST is at the last object.

If it is, CHK LIST advances to the first object as shown in block A of FIG. 12C. Decision diamond B then asks again whether CHK LIST is at the last object. If it is, then the total number of objects is counted as shown in block C, and the difference between the total number of objects and the previous count is returned as shown in block D. If CHK LIST is not at the last object, decision diamond E asks whether the object status attribute value is false. If so, the object is deleted as shown in block F. If not, then CHK LIST advances the object as shown in block G, and CHK LIST asks again whether it is at the last object as shown in decision diamond B. The loop through B, E, F, and G continues until the advanced object of block G is the last object. At this point, the total number of objects is counted as shown in block C, and the difference between the total number of objects and the previous count is returned as shown in block D.

Returning to decision diamond H in FIG. 12B, if CHK LIST is not at the last object at this point, then it goes to decision diamond I, which asks whether the object contains more than one valid object. If so, then the object status attribute value is set to false as shown in block J, and CHK LIST advances to the next object as shown in block K. CHK LIST then returns to decision diamond H, asks whether it is at the last object and continues this process until the object does not contain more than one valid object. Then decision diamond A of FIG. 12D asks if the object is the only object contained within another object. If not, then CHK LIST advances to the next object as shown in block K of FIG. 12B, and the loop through H–K of FIG. 12B and A of FIG. 12D is repeated until the object is the only object contained within another object. If the object is the only object contained within another object, then decision diamond B asks whether the status attribute value of the object which contains the object is FALSE. If so, then CHK LIST advances to the next object as shown in block K of FIG. 12B, and the loop through H–K of FIG. 12B and A–B of FIG. 12D is repeated until the status attribute value of the object which contains the object is not FALSE. At this point, decision diamond N asks whether the edge contrast of the object which contains another object is greater than the edge contrast of the object. If so, then CHK LIST sets the object status attribute value to false as shown in block D, it advances to the next object as shown in block K in FIG. 12B, and the loop through H–K of FIG. 12B and A–C of FIG. 12D is repeated until the edge contrast of the object which contains another object is not greater than the edge contrast of the object contained in another object. Then CHK LIST sets the status of the object which contains the object to FALSE as shown in block E of FIG. 12D, and it advances to the next object as shown in block K of FIG. 12D until it is at the last object.

Figure 13:
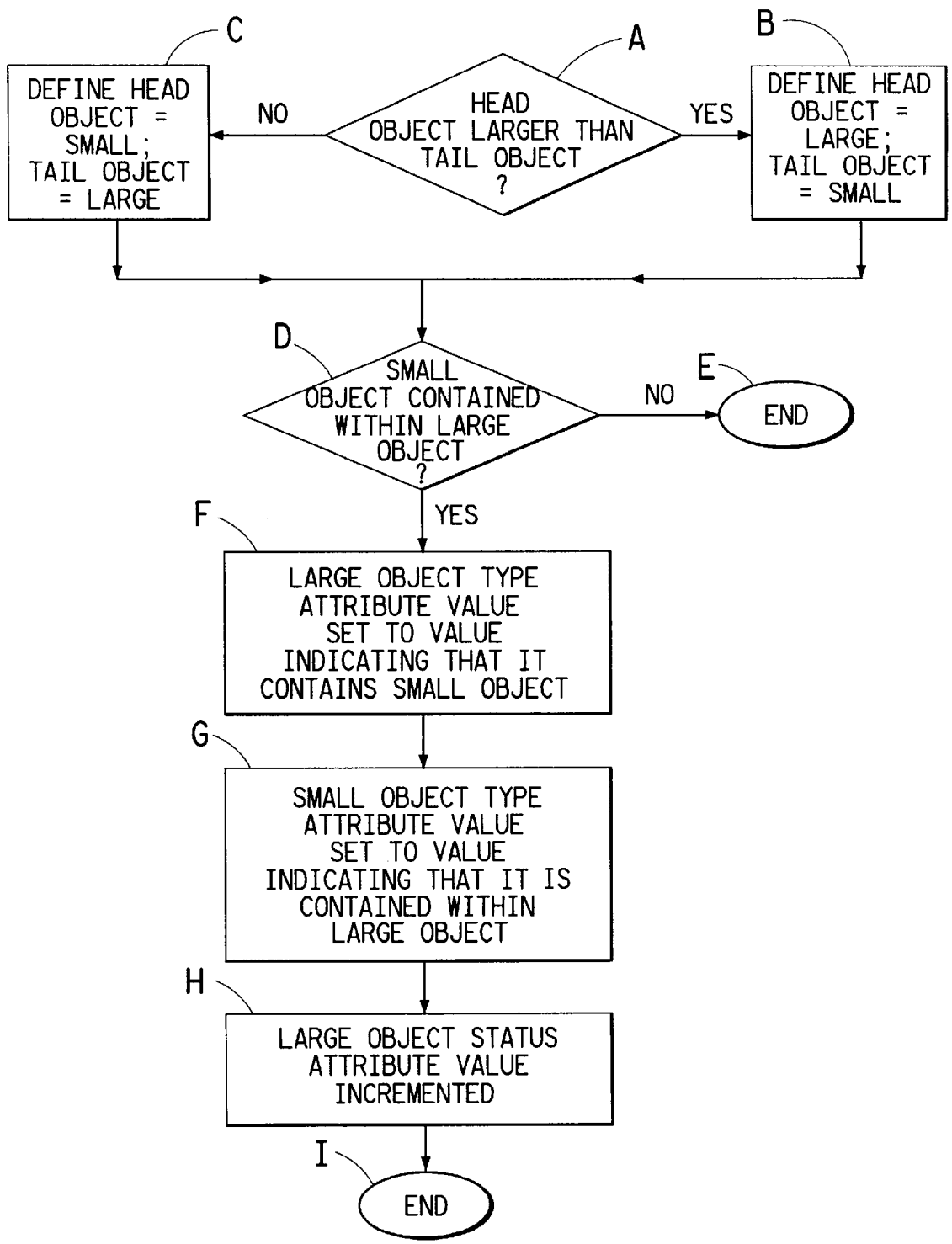
FIG. 13 is a flow chart illustrating the steps of a module SET STAT which is used with the module CHK LIST as shown in FIGS. 12A–12D.

Returning to decision diamond E in FIG. 12A, if the object count is not greater than the previous count, then decision diamond F asks if the head object is contained within another object. If so, then the head object is advanced as shown in block G, and the object count is incremented as shown in block H. Decision diamond E again asks if the incremented object count is greater than the previous count. If so, CHK LIST advances to block A of FIG. 12B as explained above. If the incremented count is not greater than the previous count, the loop through F, G, H and E in FIG. 12A is repeated until the head object is not contained within another object. Then CHK LIST advances to decision diamond I of FIG. 12A, which asks if the tail object is the last object, or if the head object is contained within another object. If the tail object is the last object, or if the head object is contained within another object, then CHK LIST advances the head object as shown in block G, and the count is incremented as shown in block H. The loop through E, F, I, G and H is repeated until the tail object is not the last object or the head object is not contained within another object. Decision diamond J then asks whether the tail object is contained within another object. If it is, then the tail object is advanced as shown in block K of FIG. 12A, and the loop through I, J and K is repeated until the tail object is not contained within another object. Then CHK LIST goes to the module SET STAT as shown in FIG. 13 to set the status of the head and tail objects as shown in block L of FIG. 12A.

The redundancy checking sub-step further includes the sub-steps of comparing the areas of a plurality of valid objects and designating one of the valid objects as a large valid object and the other of the first and second valid objects as a small valid object and determining whether the small valid object is contained in the large valid object as defined by the four extremum points of the larger object for inhomogeneous objects. The module SET STAT as shown in FIG. 13 performs these sub-steps for inhomogeneous objects. The first step of SET STAT as shown in decision diamond A of FIG. 13 is to ask whether the head object is larger than the tail object. If so, then the head object is defined as the large valid object, and the tail object is defined as the small valid object as shown in block B. If the head object is not larger than the tail object, then the head object is defined as the small valid object, and the tail object is defined as the large valid object as shown in block C. Then decision diamond D asks whether the small object is contained within the large object. If not, then SET STAT is finished, as indicated by END oval E. If the small object is contained within the large object, then the large object type attribute value is set to a value indicating that it contains a small object as shown in block F. The type attribute value tells SET STAT whether an object is contained within another object or whether the object contains another object. Also, the small object type attribute value is set to a value indicating that it is contained within a large object as shown in block G. Finally, the large object status attribute value is incremented as shown in block H. SET STAT is then finished, as indicated by the END oval I and returns to block L of FIG. 12A.

According to the method of the present invention, the redundancy checking sub-step may be performed to resolve redundancies in the homogeneous objects. When it is, the method of the present invention further includes the sub-steps of calculating the edge contrast of the large and small valid objects and deleting the large object where the average edge contrast of the large object is less than the average edge contrast of the small object and is less than a predetermined minimum edge contrast. The redundancy checking sub-step for resolving redundancies also includes the sub-steps of calculating the edge contrast of the large and small valid objects and deleting the small object where the average edge contrast of the large object is greater than the average edge contrast of the small object and is greater than the predetermined minimum contrast. These sub-steps are performed using the module CHK LIST for homogeneous objects as illustrated by the flow charts of FIGS. 14A and 14B.

Figure 14A:
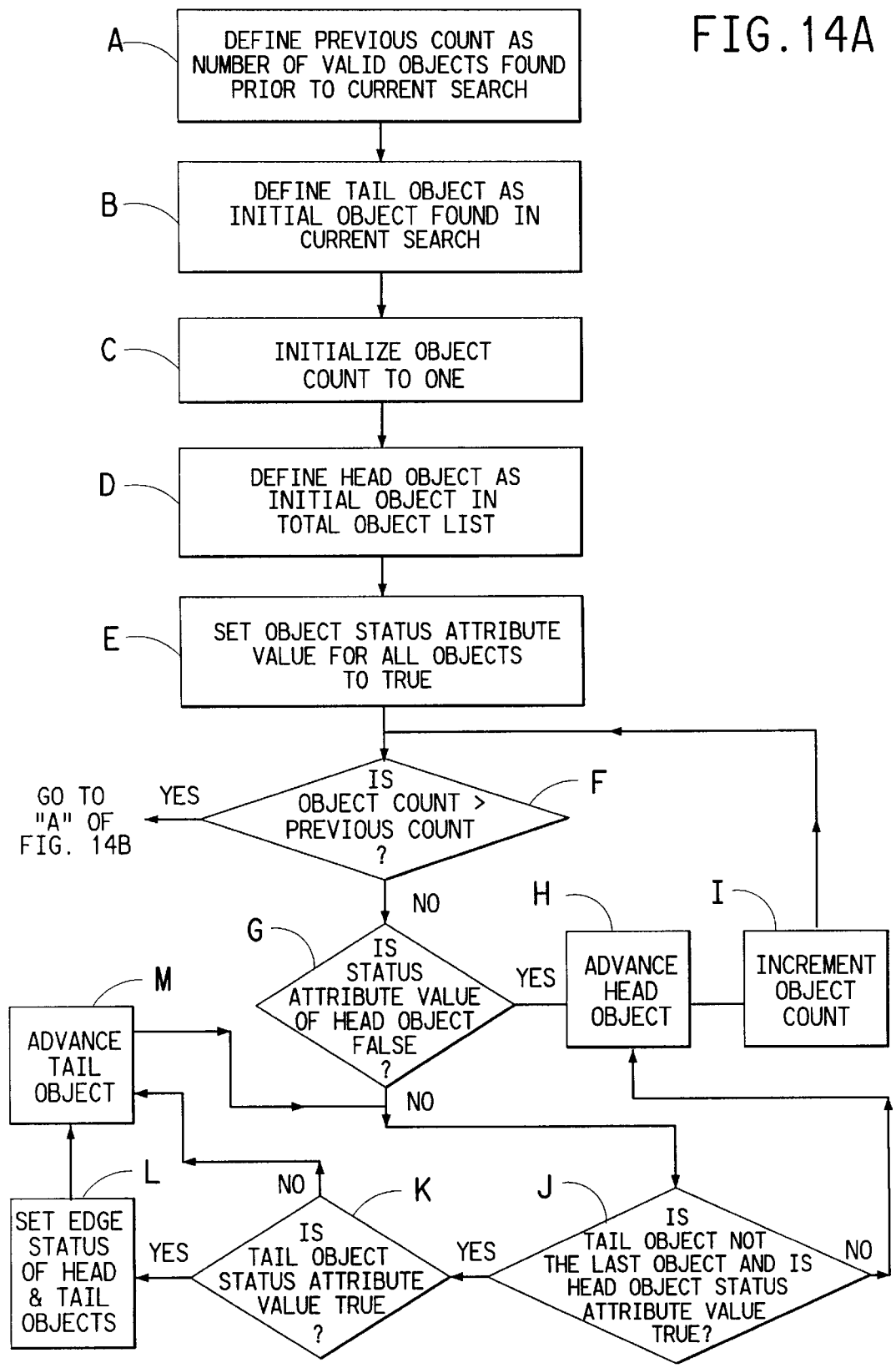
FIGS. 14A–14B comprise a flow chart illustrating the steps of a module CHK LIST which is used to resolve redundancies in homogeneous objects.
Figure 14B:
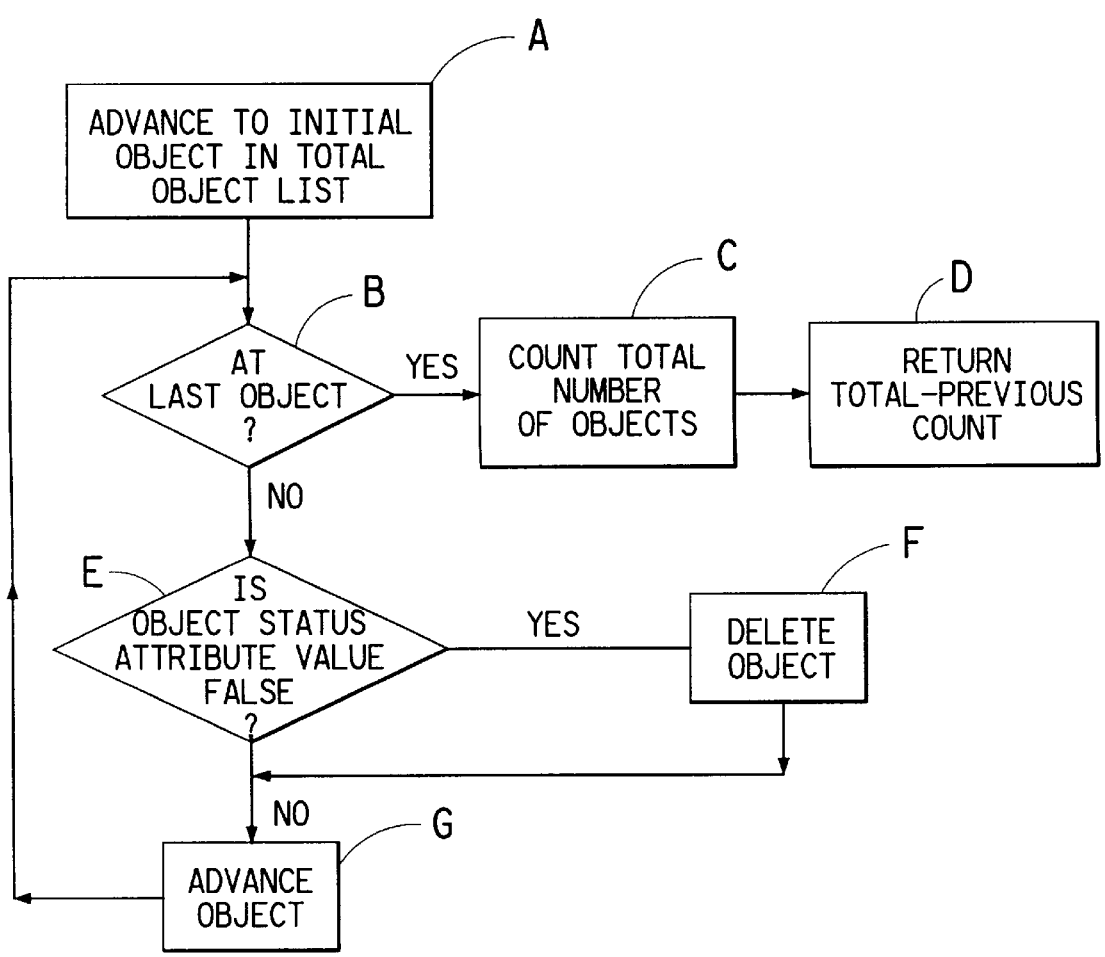

As shown in block A of FIG. 14A, the first step of the CHK LIST module, when run to delete homogenous objects, is to define the previous count as the number of valid objects found prior to the current search. Then the tail object is defined as the initial candidate object found in the current search as shown in block B. The object count is initialized to one as shown in block C, and the head object is defined as the initial object in the total object list as shown in block D. The object status attribute value is then set to "TRUE" for all objects as shown in block E. Decision diamond F asks whether the object count is greater than the previous count.

If the object count is greater than the previous count, CHK LIST advances to the initial object in the total object list as shown in block A of FIG. 12B. Decision diamond B of FIG. 14B asks if CHK LIST is at the last object. If so, the total number of objects is counted as shown in block C, and the difference between the total number of objects and the previous count is returned as shown in block D. If CHK LIST is not at the last object, then decision diamond E asks whether the object status attribute value is FALSE. If so, the object is deleted as shown in block F. If the object status is not FALSE, then object is advanced as shown in block G, and the CHK LIST module asks again whether it is at the last object as shown in decision diamond B. This process continues until CHK LIST reaches the last object, at which point the total number of objects is counted as shown in block C, and the difference between the total number of objects and the previous count is returned as shown in block D.

Returning to decision diamond F in FIG. 14A, if the object count is not greater than the previous count, then decision diamond G of FIG. 14A asks if the status attribute value of the head object is FALSE. If it is, then the head object is advanced as shown in block H, and the count is incremented as shown in block I. Decision diamond F then asks if the incremented object count is greater than the previous count. If so, CHK LIST advances to block A of FIG. 14B as explained above. The loop through G, H and I in FIG. 14A is repeated until the status of the object is not FALSE. Then CHK LIST advances to decision diamond J of FIG. 14A, which asks if the tail object is not the last object and if the head object status attribute value is TRUE. The answer to both these questions must be yes. If not, then CHK LIST advances the head object as shown in block H, and the count is incremented as shown in block I. The loop through F, G, H, I and J is repeated until the tail object is the last object and the head object status attribute value is TRUE. Decision diamond K then asks whether the tail object status attribute value is TRUE. If it is, then the edge status of the head and tail object is set as shown in block L of FIG. 14A and as shown in detail in FIG. 15 by a module SET STAT. CHK LIST then advances the tail object as shown in block M, and the loop through J, K, L and M is repeated. If the tail object status is not TRUE, then CHK LIST advances the tail object as shown in block M, and the loop through J, K and M is repeated.

Figure 15:
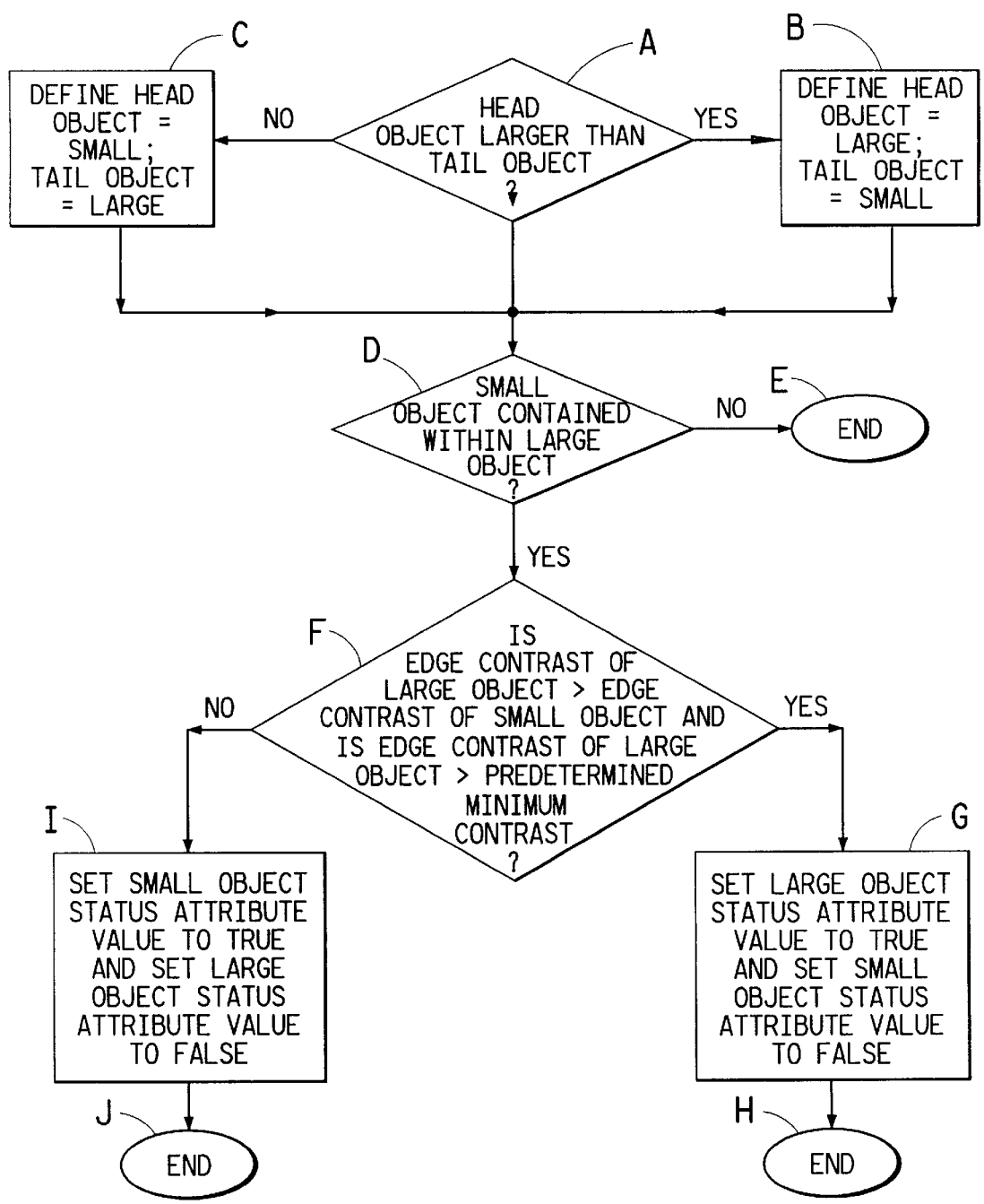
FIG. 15 is a flow chart illustrating the steps of a module SET STAT which is used with the module CHK LIST as shown in FIGS. 14A–14B.

The module SET STAT as shown in FIG. 15 performs the sub-steps of comparing the areas of a plurality of valid objects and designating one of the valid objects as a large valid object and the other of the first and second valid objects as a small valid object and determining whether the small valid object is contained in the large valid object as defined by the four extremum points of the large object for homogeneous objects. As shown in decision diamond A of FIG. 15, the first step of SET STAT is to ask whether the head object is larger than the tail object. If so, the head object is defined as a large valid object, and the tail object is defined as the small valid object as shown in block B. If the head object is not larger than the tail object, then the head object is defined as the small valid object, and the tail object is defined as the large valid object. Decision diamond D of SET STAT then asks whether the small object is contained within the large object. If not, SET STAT stops running as shown by oval E. If the small object is contained within the large object, then decision diamond F asks whether the edge contrast of the large object is greater than the edge contrast of the small object, and whether the edge contrast of the large object is greater than the predetermined minimum edge contrast. If the answer to both of these questions is yes, then the large object status attribute value is set to TRUE, and the small object status attribute value is set to FALSE as indicated by block G, and the module stops running as indicated by oval H. If the answer to at least one of the questions in decision diamond F is no, then the small object status attribute value is set to TRUE, the large object status attribute value is set to FALSE as indicated by block I, and the module stops running as indicated by oval J.

The method of the present invention further includes the step of performing a final check for redundancies of the valid object and resolving the redundancies to prevent multiple identification of the valid object. The final redundancy checking step further includes the sub-steps of comparing the areas of a plurality of valid objects and designating one of the valid objects as a large valid object and the other of the first and second valid objects as a small valid object and removing the large valid object when the small valid object and the large valid object overlap. The final redundancy checking step is performed by a module, FINAL CHK, as illustrated by the flow chart of FIGS. 16A and 16B and a module INT STAT, as illustrated by the flow chart of FIG. 17. The modules FINAL CHK and INT STAT are the same for both homogeneous and inhomogeneous objects, and are thus only illustrated once.

Figure 16A:
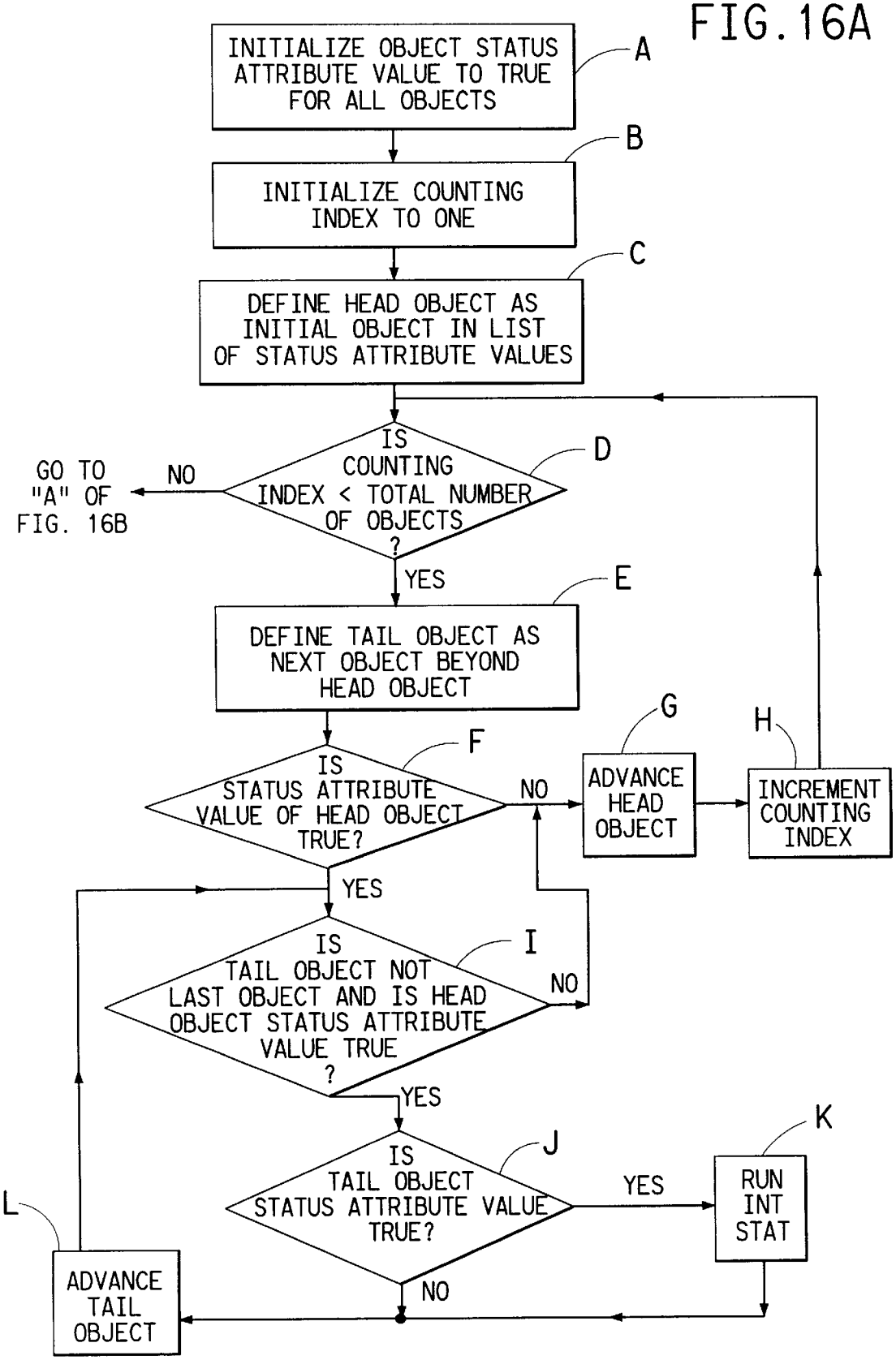
FIGS. 16A–16B comprise a flow chart illustrating the steps of a module FINAL CHK which is used to perform a final check to resolve redundancies in inhomogeneous and homogeneous objects.

The first step of FINAL CHK is to initialize the object attribute value to TRUE for all objects as shown in block A of FIG. 16A. The counting index for counting valid objects is the initialized to one as shown in block B. The head object is defined as the initial object in a list of status attribute values as illustrated in block C. Decision diamond D then asks whether the counting index is less than the total number of objects. If not, the module FINAL CHK goes to block A of FIG. 16B.

Figure 16B:
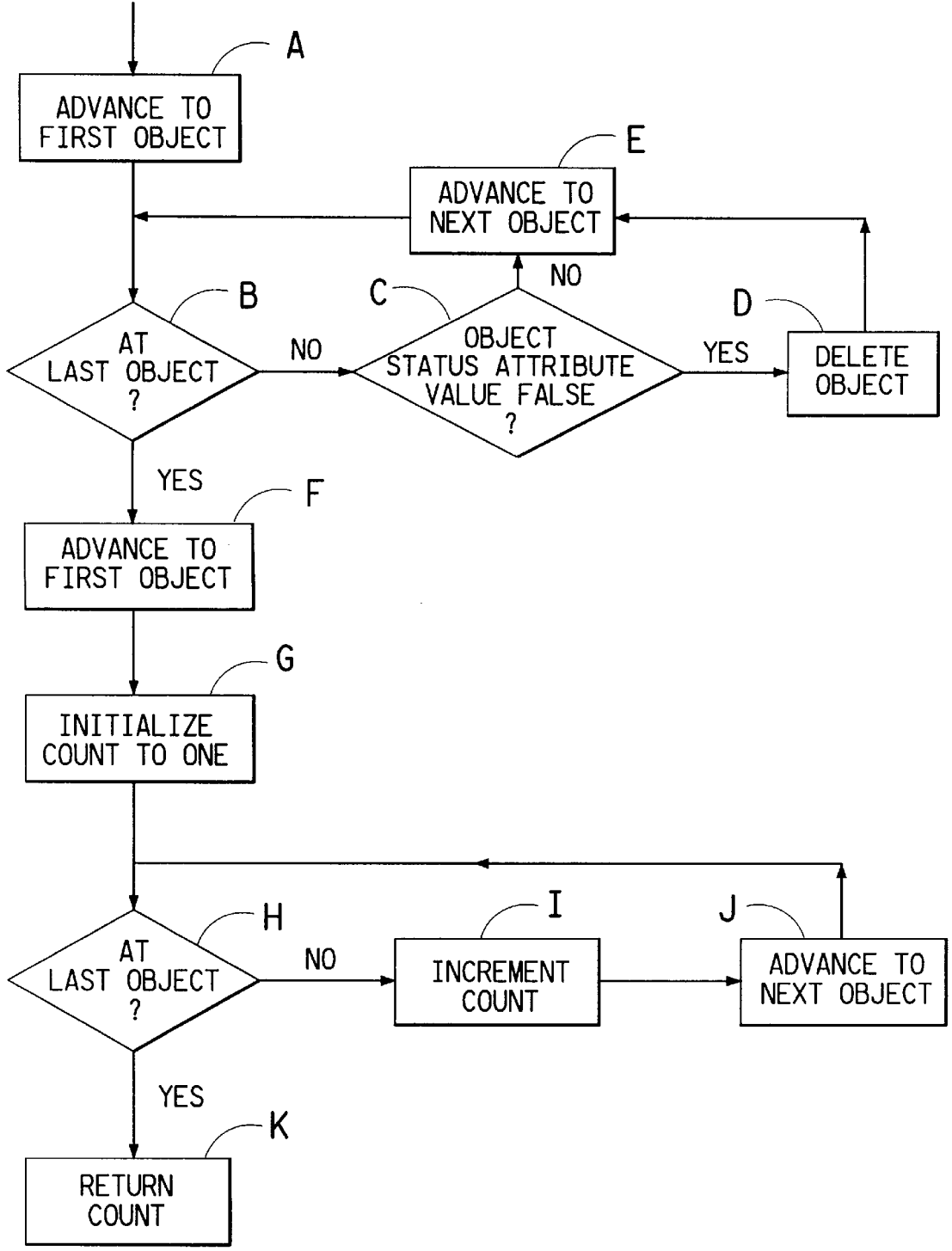

As shown in block A of FIG. 16B, FINAL CHK advances to the first object. Decision diamond B asks whether FINAL CHK is at the last object. If it is not, then decision diamond C asks whether the object status attribute value is FALSE. If not, then FINAL CHK advances to the next object as shown in block E, and decision diamond B again asks whether FINAL CHK is at the last object. The loop through B, C and E continues until FINAL CHK is at the next object. If the object status attribute value is FALSE, then the object is deleted as shown in block D. FINAL CHK then advances to the next object as shown in block E, and decision diamond B asks whether the FINAL CHK at the last object. The loop through B–E continues until the next object is the last object, at which point FINAL CHK advances to the first object as shown in block F. The count is then initialized to one as shown in block G. Decision diamond H then asks whether FINAL CHK is at the last object. If it is not, then the count is incremented as shown in block I, and FINAL CHK advances to the next object is shown in block J. Decision diamond H again asks whether FINAL CHK is the last object, and the loop through H, I and J continues until FINAL CHK is at the last object. Then the total number of valid objects as contained in count is returned as shown by block K of FIG. 16B.

Returning to decision diamond D of FIG. 16A, if the counting index is less than the total number of objects, then the tail object is defined as the next object beyond the head object as shown in block E. Decision diamond F then asks if the status attribute value of the head object is TRUE. If not, the FINAL CHK advances the head object as shown in block G and increments the counting index as shown in block H. FINAL CHK then returns to decision diamond D, and the loop through D–I continues until the status attribute value of the head object is TRUE. Then decision diamond I asks whether the tail object is not the last object and whether the head object status attribute value is TRUE. If at least one of these conditions is not met, then FINAL CHK advances the head object as shown in block G and increments the index as shown in block H. FINAL CHK then returns to decision diamond D, and the loop through D–I continues until the answer to both questions in decision diamond I is yes. Then decision diamond J asks whether the tail object status attribute value is TRUE. If not, FINAL CHK advances the tail object as shown in block L of FIG. 16A, and the loop through I, J and L is repeated until the tail object status attribute value is TRUE. Then FINAL CHK runs a module INT STAT, as shown in block K of FIG. 16A and advances the tail object as shown in block L.

Figure 17:
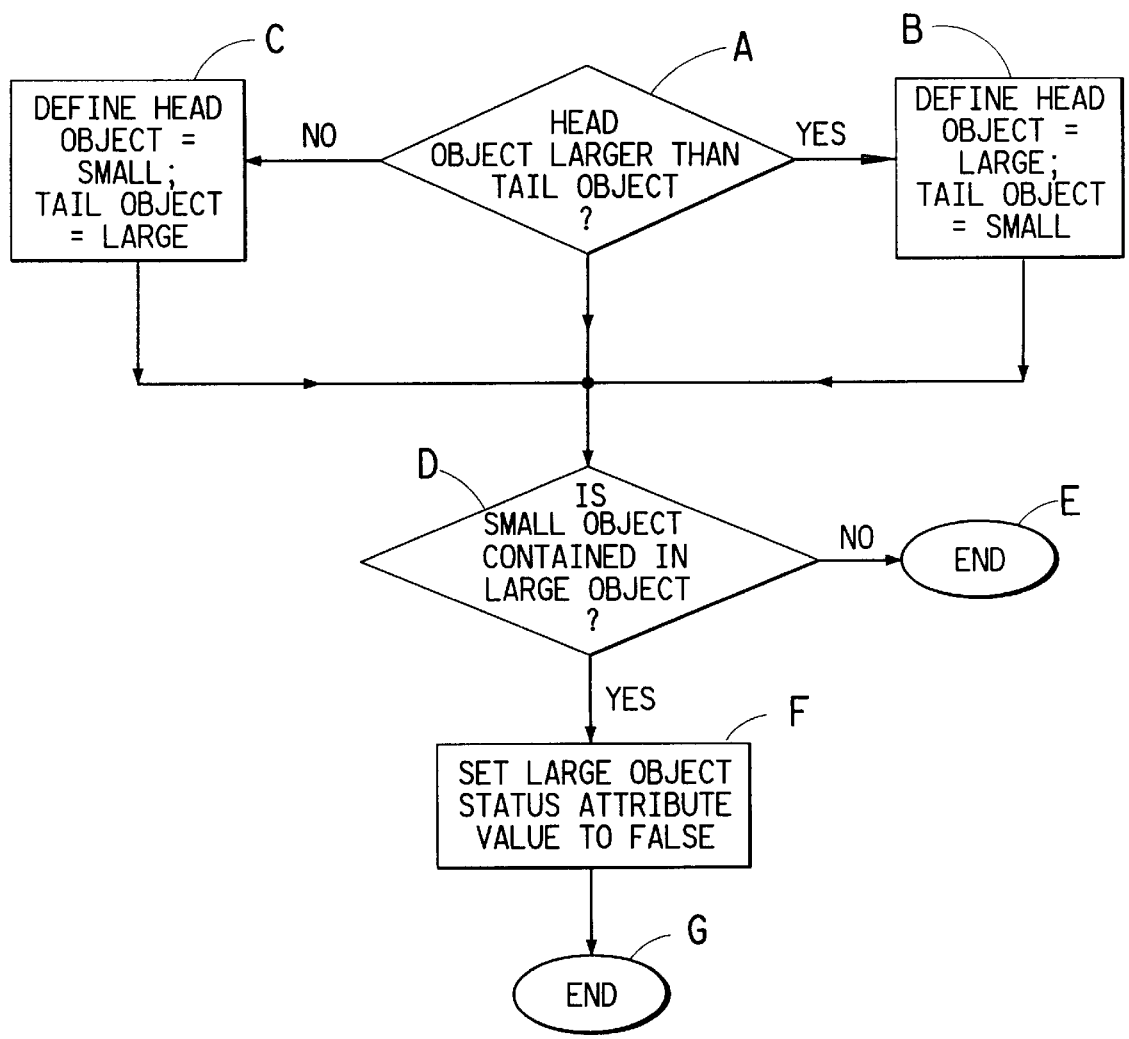
FIG. 17 is a flow chart illustrating the steps of a module INT STAT which is used with the module FINAL CHK as shown in FIGS. 16A–16B.

The steps of the module INT STAT as illustrated in block K of FIG. 16A are shown in detail in FIG. 17. Decision diamond A of FIG. 17 asks whether the head object is larger than the tail object. If so, the head object is defined as the large valid object, and the tail object is defined as the small valid object as shown in block B. If the head object is not larger than the tail object, then the head object is defined as the small valid object, and the tail object is defined as the large valid object as shown in block C. Decision diamond D then asks whether the small valid object is contained in the large valid object. If not, then INT STAT is at its end, as shown by oval E. If the small valid object is contained in the large valid object, then the large object status attribute value is set to FALSE as shown in block F, and INT STAT is at its end as shown by oval G.

Figure 18:
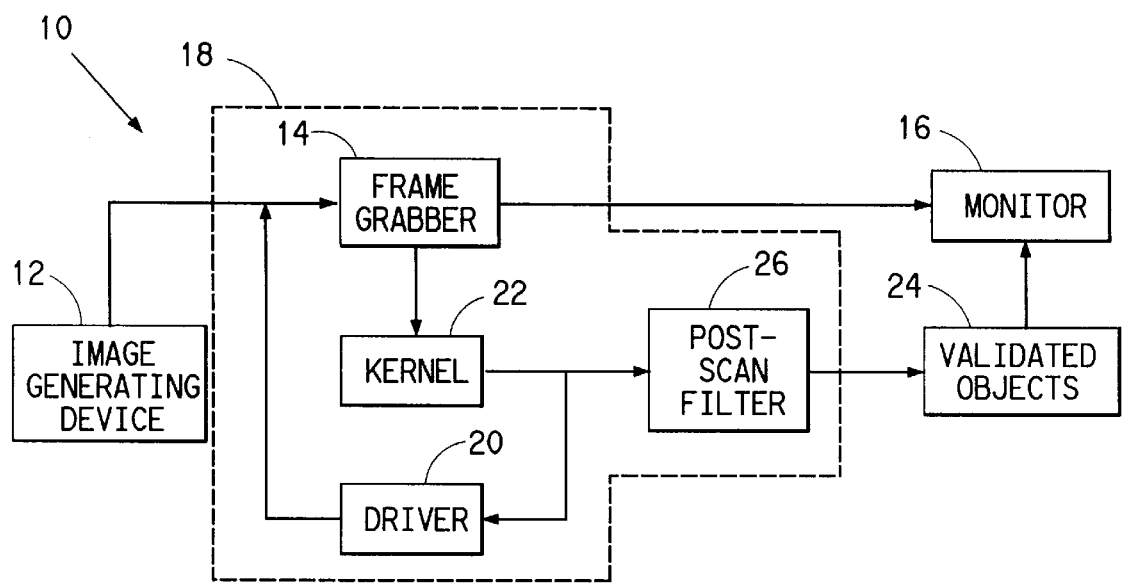
FIG. 18 is a block diagram showing the components of the system of the first embodiment of the present invention.

In accordance with the first embodiment of the present invention, there is provided an image analysis system for identifying at least one valid object in a background. The valid object has at least one predetermined attribute value which represents the definition of a valid object of an object to be identified. A block diagram of the system of the present invention is shown in FIG. 18. A system for identifying at least one valid object in a background is shown generally at 10 in FIG. 18.

The system of the present invention comprises means for generating an image of the object and the background. As shown in FIG. 18, the means for generating an image of the object and the background comprises a camera 12. Although a CCD camera is generally used with the present invention, any type of image generating apparatus may be used without departing from the general principles of the present invention.

The system of the present invention also comprises means for digitizing and storing the image. The means for digitizing and storing the image comprises a frame grabber 14 as shown in FIG. 18. The frame grabber digitizes and stores the video image in one frame, as known to one skilled in the image processing art. Alternatively, the means for digitizing and storing the image comprises a video digitizer, which also digitizes and stores the image, although not necessarily in one frame. The system of the present invention further comprises means for displaying the image. The means for displaying the image comprises a monitor 16 as shown in FIG. 18.

The system of the present invention also comprises computer means. The computer means comprises a computer system 18 as shown in FIG. 18. The computer system comprises a central processing unit (CPU) and a memory. The computer means also includes a driver 20, a kernel 22 and a post-scan filter 26 as shown in FIG. 18. Driver 20 stores the definition of the valid object. The entropic kernel 22 generates a pixel value histogram of the image and entropically selects a threshold pixel value such that the entropy function of the histogram is maximized. Entropic kernel 22 also searches the image for at least one candidate object and validates the candidate object having the valid object predetermined attribute value to identify the valid object. The validated objects are represented by box 24 in FIG. 18. The driver and the kernel may comprise software incorporated in the memory. Alternatively, the driver and the kernel may be programmed into a programmable, read-only memory (PROM) from which the software may be retrieved. The post-scan filter is shown at 26 in FIG. 18 and provides a final check to remove redundancies in overlapping objects as described above.

In accordance with a second embodiment of the present invention, there is also provided a method of identifying at least one valid object having at least one predetermined attribute value in a background. This method differs from the method of the first embodiment in that threshold pixel values are first selected, then a list of all possible ordered pairs of the selected thresholds is created. The list of all ordered pairs of thresholds is subsequently used to define data sub-spaces in which the image is searched, as described above with respect to the first embodiment. In a first implementation of the second embodiment, a plurality of threshold pixel values is automatically selected, a list of all ordered pairs of thresholds is generated to define multiple data sub-spaces, and then the image is multiply searched, once in each sub-space. In a second implementation of the second embodiment, the threshold pixel values are recursively selected, a list of all ordered pairs of thresholds is generated to define multiple data sub-spaces, and the image is multiply searched, once for each sub-space. The recursive selection of the second implementation is a more specific way of performing the automatic selection of the first implementation.

In the first implementation of the second embodiment, the step of sub-dividing the data space into a plurality of sub-spaces comprises generating a pixel value histogram of the data space, generating a plurality of pixel value upper and lower histograms, and automatically selecting a threshold pixel value for each upper histogram and each lower histogram. A list of all ordered pairs of the selected threshold pixel values is then generated, and the pairs of threshold pixel values are used as respective lower delimiters and upper delimiters to define the plurality of sub-spaces. In an entropic thresholding version of the first implementation of the second embodiment, the pixel value histogram has an entropy function, each pixel value upper and lower histogram has a respective entropy function, and the threshold pixel value for each upper histogram and each lower histogram is automatically selected such that the entropy function for each histogram is maximized.

Figure 19A:
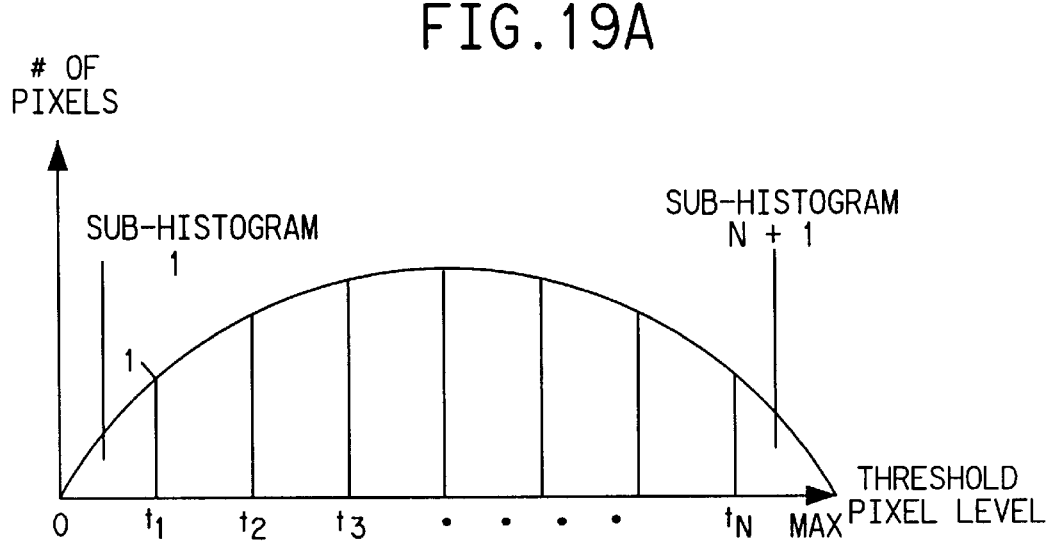
FIG. 19A is a pixel value histogram which has been divided into N+1 sub-histograms in accordance with the preferred embodiment of the second embodiment of the present invention.

FIG. 19A illustrates selection of N thresholds to define N+1 sub-histograms. However, it should be noted that the threshold pixel values do not necessarily have to be automatically selected. These threshold pixel values could be selected by the method illustrated by FIGS. 9A–9C or by some other method. Specifically, FIG. 19A shows a pixel value histogram having N threshold pixel values, $t_1$–$t_N$. The pixel value histogram is divided into N+1 sub-histograms using each of the threshold pixel values. This could be done by any method, such as binary subdivision of the histogram, etc. The steps for selecting N threshold pixel values may be performed, for example, by the module ENTROPY and may be the same as those shown in the flow chart of FIG. 3. A list of all ordered pairs of the selected threshold pixel values is then generated. The pairs of threshold pixel values are then used as respective lower delimiters and upper delimiters to define the plurality of data sub-spaces.

Figure 19B:
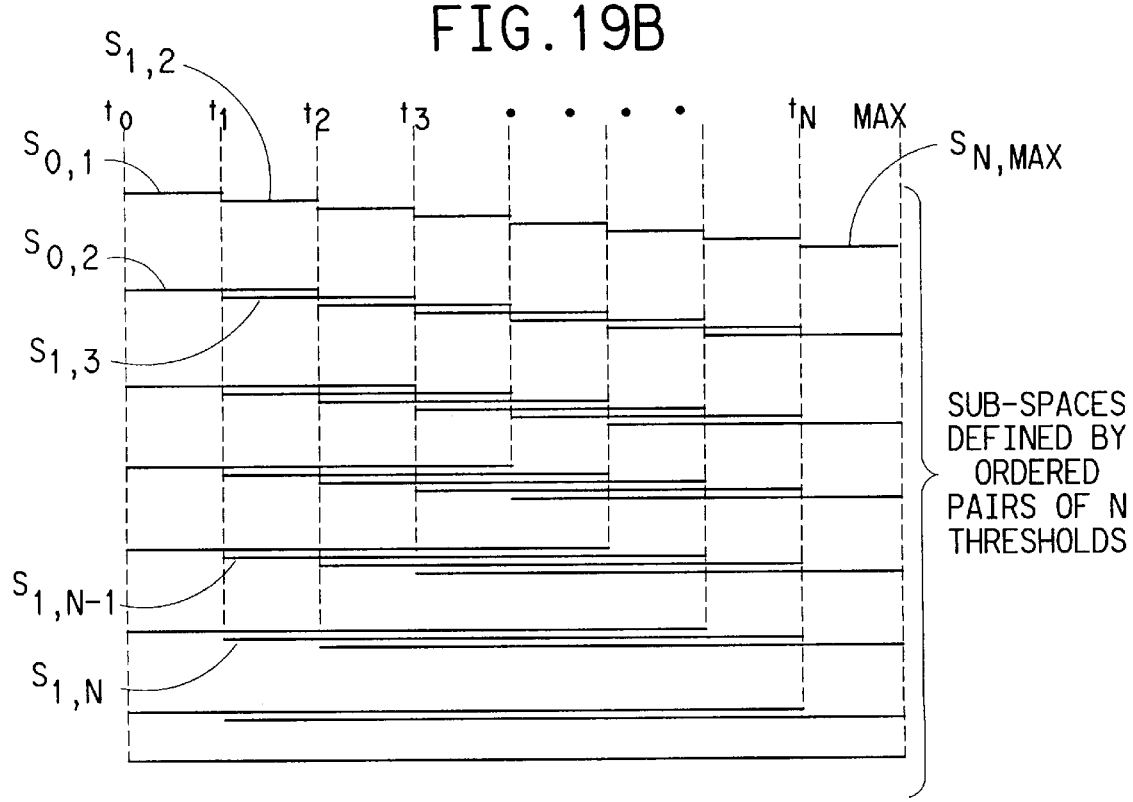
FIG. 19B is a schematic illustration of a set of possible data subspaces defined by the ordered pairs of N thresholds shown by the corresponding portion of the abscissa, or x axis, of FIG. 19A.

The data sub-spaces defined by the ordered pairs of the N thresholds are shown in FIG. 19B. Specifically, each of the horizontal lines in FIG. 19B illustrates a possible data subspace defined by two of the thresholds shown along the abscissa of FIG. 19A. Data sub-spaces are indicated by the reference character S followed by a double subscript. For clarity of illustration only exemplary data sub-spaces are labeled by the reference character S followed by a double subscript, e.g. $S_{0,1}$, $S_{0,2}$, $S_{1,2}$, $S_{1,3}$, ... $S_{1,N-1}$, $S_{1,N}$, ... $S_{N,MAX}$. It should be noted that the thresholds may be selected by any method, including binary division of a histogram, division of a histogram at predetermined regular or irregular intervals, or entropic thresholding illustrated above with respect to the first embodiment. Other departures are considered within the scope of the present invention. For instance, it is possible to use a co-occurrence matrix as described above in the second embodiment instead of the histogram to do adaptive thresholding.

If the method of FIG. 3 is employed for selecting the N threshold pixel values, the threshold selecting step includes the sub-steps of sequentially partitioning the histogram at each pixel value into a first and a second partition. The entropy function is then computed for each partition. The entropy function of the histogram is defined as the sum of the entropy functions of the first and second partitions. A threshold pixel value is then selected such that the entropy function of the histogram is maximized. The pixel value histogram is then subdivided using the selected threshold pixel value as defined above which maximizes the entropy function of the histogram as an upper delimiter and a lower delimiter to create an upper histogram and a lower histogram. The partitioning, computing and selecting steps are then repeated, where the repetition of the selecting step selects a next successive threshold pixel value. The subdividing step is then repeated using the next successive entropic threshold pixel value as the global entropic threshold pixel value as defined in the selecting step to iteratively calculate the N threshold pixel values.

Figure 20:
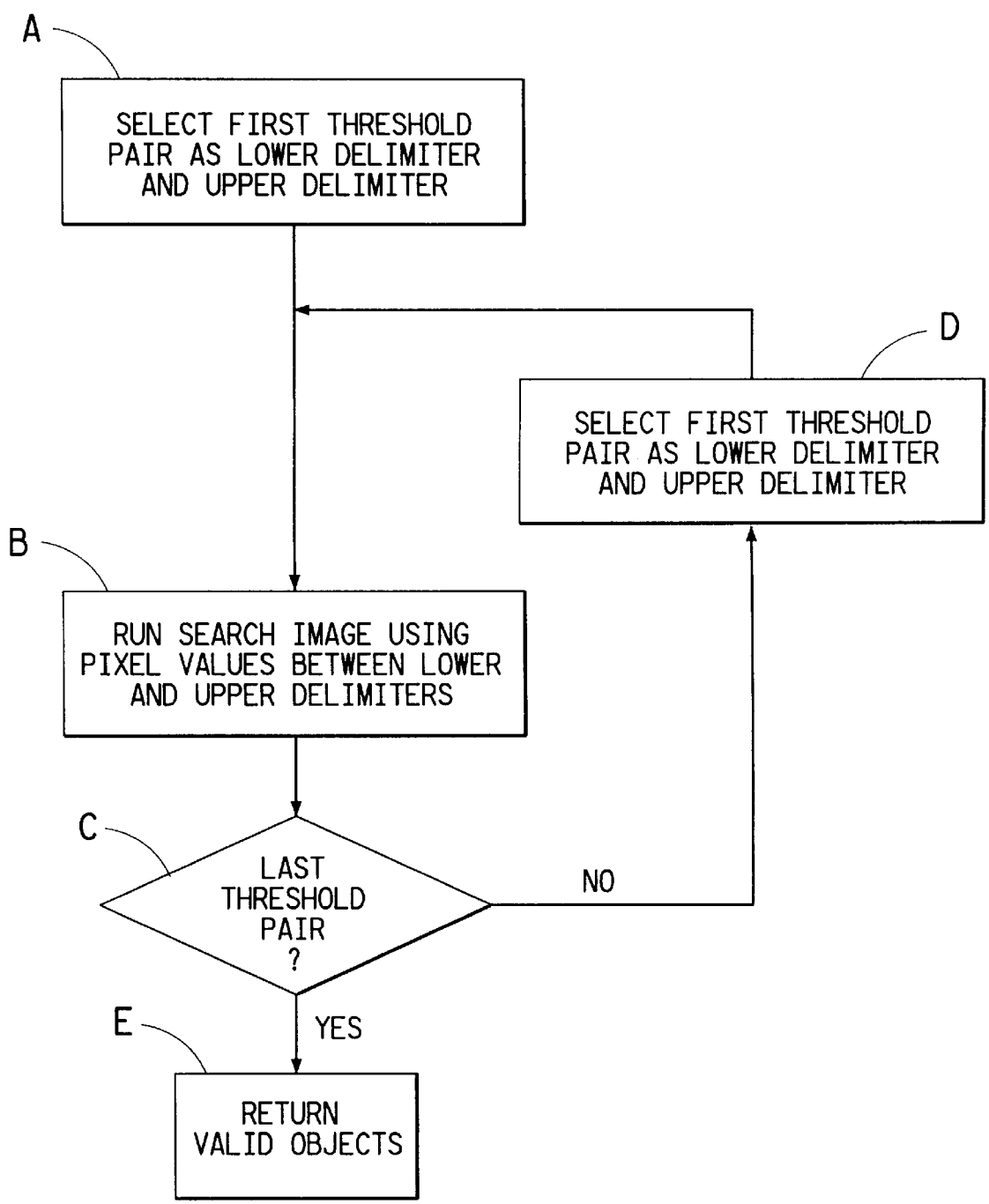
FIG. 20 is a flow chart illustrating the steps of a module which uses the list of all ordered pairs of threshold pixel values to define data sub-spaces according to a first implementation of the second embodiment of the present invention.

The module as shown in FIG. 20 illustrates a method of using the pairs of threshold pixel values as lower delimiters and upper delimiters, respectively, to define data sub-spaces in which to search the image, as in the first implementation of the second embodiment. The first step in the module as shown in block A of FIG. 20 is to select the first threshold pair from the list of threshold pairs. The first threshold of the pair defines the lower bound and the second threshold pair defines the lower bound for a first data sub-space. As seen in block B, the portion of the image where the pixel values are within the range of the defined sub-space is searched. Decision diamond C then asks whether the last threshold pair of the list has been reached. If not, then the next threshold pair from the list of threshold pairs is selected as shown in block D of FIG. 20. The first threshold of the pair defines the lower bound, and the second threshold of the pair defines an upper bound for a next data sub-space. The portion of the image where the pixel values are within the range of the next defined sub-space is searched as in block B. When the last threshold pair on the list has been reached, the repetitive searching of the image stops and the valid objects are returned as shown in block E of FIG. 20.

As noted above, in a second implementation of the second embodiment, the threshold values are recursively selected, and a list of all ordered pairs of thresholds is then generated to define multiple data sub-spaces. The pairs of threshold pixel values are then used as respective lower delimiters and upper delimiters to define data sub-spaces. The image is multiply searched, once for each sub-space. The recursively selecting sub-step further comprises the sub-steps of generating a pixel value histogram of the data space, where the pixel value histogram has an entropy function, entropically selecting a threshold pixel value such that the entropy function of the histogram is maximized, sub-dividing the histogram into an upper histogram and a lower histogram using the threshold pixel value, and recursively repeating the steps of generating a pixel value histogram entropically selecting a threshold pixel value, and sub-dividing the histogram for each of the upper and lower histograms, wherein the repetition of the entropic selection step selects a next threshold pixel value, thereby recursively partitioning the data space until a condition for terminating the recursive selection has been reached. The terminating condition may be that a minimum pixel value partition width has been reached during the recursive sub-dividing of the histograms.

Figure 21:
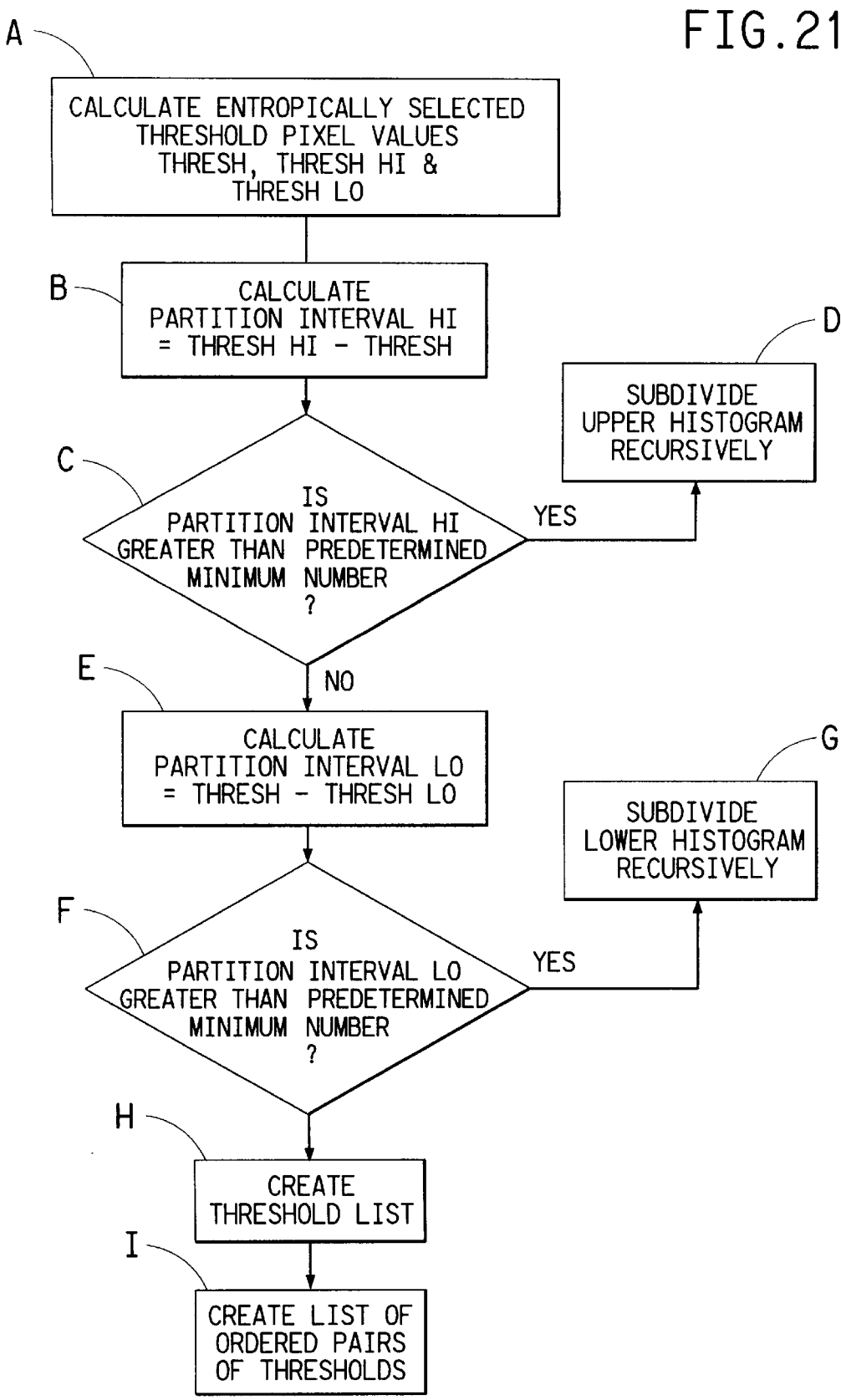
FIG. 21 is a flow chart illustrating the steps of a module which recursively selects threshold pixel values and creates a list of all ordered pairs of threshold pixel values to define data sub-spaces according to a second implementation of the second embodiment of the present invention.

The module as shown in FIG. 21 illustrates a preferred case of the second implementation of the second embodiment, where a plurality of sub-spaces are defined by recursively partitioning the data space until a condition for terminating the multiple threshold selecting has been reached. The steps of generating a pixel value histogram and entropically selecting a threshold pixel value are performed as described above with respect to FIG. 3, so that, as shown in block A of the module of FIG. 21, the entropically selected threshold pixel values THRESH, THRESH HI AND THRESH LO are calculated. As shown in block B, PARTITION INTERVAL HI and PARTITION INTERVAL LO are calculated as the difference between THRESH HI and THRESH and between THRESH and THRESH LO, respectively, for the histogram. Decision diamond C then asks whether the PARTITION INTERVAL HI is greater than the predetermined minimum number. If it is, then the upper histogram is recursively subdivided. If the PARTITION INTERVAL HI is not greater than the predetermined minimum number, then the lower histogram is recursively subdivided as shown in blocks E–G. Decision diamond F then asks whether the PARTITION INTERVAL LO is greater than the predetermined minimum number. If it is, then the lower histogram is recursively subdivided. If the PARTI- TION INTERVAL LO is not greater than the predetermined minimum number, then the recursive subdividing stops, the condition for terminating the multiple threshold selecting having been reached, a list of selected thresholds is created as shown in block H and a list of ordered pairs of all thresholds is created as shown in block I of FIG. 21.

In both the first and the second implementations of the second embodiment, the validating step comprises the sub-step of performing a redundancy check to prevent multiple identifications of the candidate object. The sub-step of performing a redundancy check in the first or second implementation may be done as described above with respect to the first embodiment. The sub-step of performing a redundancy check in the first or second implementation may alternately be done by selecting the optimum representation of the candidate object, and comparing the candidate object attribute values in the selected representation to the valid object predetermined attribute values to identify the valid object. The sub-step of selecting the optimum representation comprises comparing each representation of the candidate object to the valid object predetermined attribute values, determining the mathematical distance between the attribute values of each candidate object and the valid object predetermined attribute values, and selecting the candidate object that is closest to the valid object predetermined attribute values. This validation may be performed by the module CHK LIST, as described above, or it may be performed by some other method.

Either the first or the second implementation of the second embodiment may be implemented iteratively in an image analysis system such as that shown in FIG. 18. As noted above, by iterative, it is meant the process of dividing a histogram into upper and lower histograms for a predetermined number of N divisions or iterations so as to create N+1 sub-histograms.

Alternatively, the first or the second implementation of the second embodiment may be implemented in a parallel processing manner. The parallel processing implementation uses the same threshold selection as described above for the first implementation. In the second implementation, portions of the image corresponding to each sub-space are searched in parallel for at least one candidate object. The searching step includes the sub-steps of scanning the portions of the image corresponding to each sub-space for at least one candidate object and tracing the candidate object having boundary pixel values within the sub-space.

Figure 22:
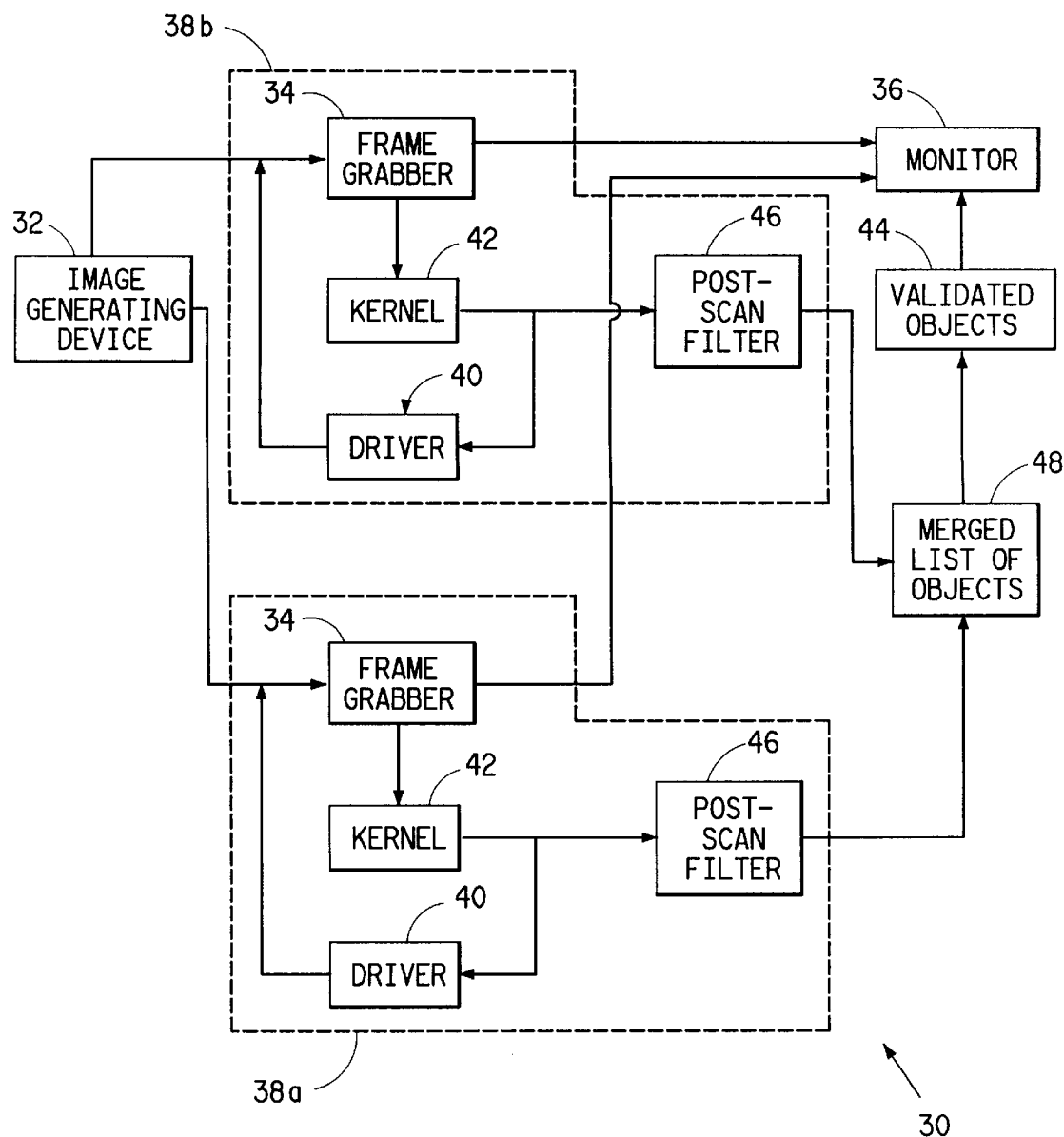
FIG. 22 is a block diagram of the system of the present invention in accordance with a parallel processing implementation of the second embodiment of the present invention.

The parallel processing implementation of the second embodiment may be implemented in a parallel processing image analysis system. The parallel processing image analysis system may be a system such as that shown in FIG. 18, but the image analysis system of FIG. 22 is preferred, as will become apparent from the accompanying description. A parallel processing system is shown generally at 30 in FIG. 22. The system includes means for generating an image of the object and the background. As shown in FIG. 22, the means for generating an image of the object and the background comprises an image generating apparatus, such as a camera, 32. Although a CCD camera is generally used with the present invention, any type of image generating apparatus may be used without departing from the general principles of the present invention. A CCD camera, Model XC77, commercially available from Sony, Inc. of Cyprus, Calif., has been proposed for use with the parallel processing system of the present invention.

The parallel processing system also comprises means for digitizing and storing the image. The means for digitizing and storing the image comprises a frame grabber 34 as shown in FIG. 22. The frame grabber digitizes the video image and stores it in one frame, as known to one skilled in the image processing art. A frame grabber, Model 2851, which is commercially available from Data Translation, Inc. of Marlboro, Mass., has been proposed for use with the parallel processing system of the present invention. Alternatively, the means for digitizing and storing the image may comprise a video digitizer, which also digitizes and stores the image, although not necessarily in one frame. The parallel processing system of the present invention further comprises means for displaying the image. The means for displaying the image comprises a monitor 36 as shown in FIG. 22.

The parallel processing system of the present invention also comprises computer means including a plurality of parallel processors. The plurality of parallel processors comprises a main processor 38a and at least one other parallel processor 38b as shown in FIG. 22. A 33 MHz 386 PC computer, commercially available from Dell Computers of Austin, Tex., has been proposed for use with a Quadputer parallel processing board, commercially available from Microway of Kingston, Mass., for the parallel processors of the present invention. Each parallel processor of the present invention comprises a driver 40, an entropic kernel 42 and a post-scan filter 46 as shown in FIG. 22. The driver stores the definition of a valid object. In one implementation, the kernel of the main processor generates a pixel value histogram of the image, selects N threshold pixel values, subdivides the pixel value histogram into N+1 sub-histograms, creates a threshold list and determines all possible ordered pairs of thresholds to define the plurality of sub-spaces. The main processor "assigns" the parallel processors the task of searching each sub-space for candidate objects, that is, the main processor controls how the parallel processors are employed and "assigns" tasks to them and waits for the results. Each parallel processor searches portions of the image corresponding to the assigned sub-space(s). In a first implementation the main processor then resolves redundancies and validates the candidate objects having the predetermined attribute values found in the search and merges the valid objects found by all the parallel processors. The validation step is performed by the method of resolving redundancies as described above with respect to the first embodiment, or, more preferably, it may be performed by the optimum representation method as described with respect to the second embodiment. In a second implementation each parallel processor validates the objects and the main processor then resolves redundancies and merges the valid objects. This is done by the method of resolving redundancies of the first embodiment.

Each parallel processor of the present invention may comprise software for performing the functions of the driver and the kernel as described above. Alternatively, each parallel processor may comprise a programmable read-only memory (PROM) from which the software may be retrieved. Each parallel processor of the configuration shown in FIG. 22 has a separate kernel and a separate driver. However, alternate configurations may be used in this embodiment without departing from the scope or spirit of the invention. For instance, each parallel processor may have a separate kernel, but all the processors may share a common driver. Alternatively, each processor may have a separate driver, but all the processors may share a common kernel. Finally, all the processors may share a common kernel and a common driver. In all of these configurations, each processor is dedicated to a specific window in gray level space and recursively searches for instances of valid objects within its appointed window.

The validated objects from each parallel processor are merged to one list as shown in box 48. The merging step involves performing one final redundancy check to prevent multiple identification of a valid object. The validated objects are represented by box 44 in FIG. 22. A post-scan filter is shown at 46 in FIG. 22 and provides a final check to remove redundancies in overlapping objects as described above.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of identifying at least one valid object having at least one predetermined attribute value in a background, comprising the steps of:

(a) generating an image of the object and the background;
   (b) defining a data space representative of the image;
   (c) generating a list of ordered threshold pairs;
   (d) subdividing the data space into a plurality of sub-spaces by using the threshold pairs;
   (e) selecting at least one sub-space;
   (f) searching the image multiple times using each selected sub-space for at least one representation of a candidate object, wherein the candidate object has at least one predetermined attribute value; and
   (g) validating the candidate object having the predetermined attribute value to identify the at least one valid object.

2. The method of claim 1, wherein the step of multiply searching the image comprises scanning the image once using each of the sub-spaces simultaneously.

3. The method of claim 1, wherein the step of multiply searching the image comprises scanning the image multiple times using a selected sub-space for each scan.

4. The method of claim 1, wherein the data space comprises a color space of the image.

5. The method of claim 1, wherein the data space comprises a space resulting from the transformation of pixel values of an image.

6. The method of claim 1, wherein the step of defining the data space comprises generating a gray level histogram of the image, where the gray level histogram has an entropy function.

7. The method of claim 6, wherein the step of selecting a sub-space comprises entropically selecting a threshold gray level such that the entropy function of the histogram is maximized.

8. The method of claim 7, wherein the step of entropically selecting a threshold pixel value includes the sub-steps of:

(i) sequentially partitioning the pixel value histogram at each pixel value into a first partition and a second partition, and
   (ii) computing the entropy function for each partition, where the total entropy function of the histogram is defined as the sum of the entropy function of the first partition and the entropy function of the second partition.

9. The method of claim 1, wherein the subdividing step includes subdividing the data space into an upper sub-space and a lower sub-space, further including the steps of recursively repeating the steps of subdividing the data space into an upper sub-space and a lower sub-space, selecting at least one upper or lower sub-space, searching the image multiple times using each selected sub-space for at least one representation of a candidate object, and validating the candidate object having the predetermined attribute value, wherein the repetition of the selection step selects a next successive sub-space, thereby recursively partitioning the data space until a condition for terminating the multiple searching has been reached.

10. The method of claim 1, wherein the validating step comprises performing a redundancy check to prevent multiple identifications of the candidate object of step (g) by:

(i) calculating the candidate object attribute values for each selected representation, and
    (ii) comparing the candidate object attribute values in the selected representation to the valid object predetermined attribute values to identify the valid object.

11. The method of claim 1, wherein the step of generating a list of ordered threshold pairs comprises the sub-steps of:

(i) automatically selecting a plurality of threshold pixel values in the data space;
    (ii) generating a list of all ordered pairs of threshold pixel values.

12. The method of claim 11, wherein the step of subdividing the data space into a plurality of sub-spaces comprises the sub-steps of:

(i) generating a pixel value histogram of the data space,
    (ii) generating a plurality of pixel value upper and lower histograms,
    (iii) automatically selecting a threshold pixel value for each upper histogram and each lower histogram,
    (iv) generating a list of all ordered pairs of the selected threshold pixel values, and
    (v) using the pairs of threshold pixel values as respective lower delimiters and upper delimiters to define the plurality of data sub-spaces.

13. The method of claim 12, wherein the pixel value histogram has an entropy function, each pixel value upper and lower histogram has a respective entropy function, and the threshold pixel value for each upper histogram and each lower histogram is automatically selected such that the entropy function for each histogram is maximized.

14. The method of claim 11, wherein the sub-step of automatically selecting a plurality of threshold pixel values comprises recursively selecting the threshold pixel values for the data space, and further wherein the step of subdividing the data space into a plurality of sub-spaces comprises using the pairs of threshold pixel values as respective lower and upper delimiters to define data sub-spaces in which to search the image.

15. The method of claim 14, wherein the recursively selecting sub-step further comprises the sub-steps of:

(A) generating a pixel value histogram of the data space, the pixel value histogram having an entropy function,
    (B) entropically selecting a threshold pixel value such that the entropy function of the histogram is maximized,
    (C) subdividing the histogram into an upper histogram and a lower histogram using the threshold pixel value, and
    (D) recursively repeating steps (A), (B) and (C) for each of the upper and lower histograms, wherein the repetition of step (B) selects a next threshold pixel value, thereby recursively partitioning the data space until a condition for terminating the recursive selection has been reached.

16. The method of claim 15, wherein the terminating condition is that a minimum pixel value partition width has been reached during the recursive subdividing of the histograms.

17. The method of claim 16, wherein the validating step (g) comprises the sub-step of performing a redundancy check to prevent multiple identifications of the candidate object by:
  (i) selecting the optimum representation of the candidate object, and
  (ii) comparing the candidate object attribute values in the selected representation to the valid object predetermined attribute values to identify the valid object.

18. The method of claim 16, wherein the searching step (f) comprises the sub-steps of:
  (i) selecting a sub-space,
  (ii) generating a pixel value histogram of the image, the pixel value histogram having an entropy function,
  (iii) entropically selecting a threshold pixel value such that the entropy function of the histogram is maximized,
  (iv) searching the image using the entropically selected threshold pixel value for at least one candidate object.

19. The method of claim 18, further comprising the sub-steps of:
  (v) subdividing the pixel value histogram into an upper histogram and a lower histogram using the entropic threshold pixel value as defined by step (iii);
  (vi) recursively repeating steps (iii)–(v) for each of the upper and lower histograms, wherein the repetition of step (iii) selects the next entropic threshold pixel value, thereby recursively partitioning the pixel value histogram until a condition for terminating the multiple searching has been reached.

20. A method of identifying at least one valid object having at least one predetermined attribute value based on at least one predetermined attribute value of a previously identified object in a background, comprising the steps of:
  (a) generating a set of training images in a background;
  (b) defining a data space representative of the set of training images, wherein the data space comprises a plurality of sub-spaces which are defined by a list of threshold pairs;
  (c) generating a list of ordered threshold pairs;
  (d) subdividing the data space into a plurality of sub-spaces using the list of threshold pairs;
  (e) searching the set of training images multiple times using once in each selected sub-space, to generate a plurality of representations of candidate objects, wherein each candidate object has at least one predetermined attribute value;
  (f) validating the candidate object having the predetermined attribute values to identify at least one valid object for the set of images, wherein each valid object has a sub-space associated therewith;
  (g) generating a reduced-size list of the ordered threshold pairs that correspond to each valid object for the set of training images;
  (h) generating a set of testing images in another background;
  (i) defining a data space representative of the set of testing images;
  (j) subdividing the data space of step (i) into a reduced set of data sub-spaces corresponding to each valid object of step (f) by using the reduced-size list of threshold pairs;
  (k) searching the set of testing images of step (h) multiple times, using each selected sub-space of the reduced set of sub-spaces, once in each sub-space of the reduced set of data sub-spaces, to generate a plurality of representations of at least one candidate object, wherein the candidate object has the at least one predetermined attribute value; and
  (l) validating the at least one candidate object having the valid object predetermined attribute value.

* * * * *